US012801879B2

(12) United States Patent
Makino

(10) Patent No.: US 12,801,879 B2
(45) **Date of Patent: *Nov. 17, 2026**

(54) COLOR MANAGEMENT FOR AN IMAGE FORMING APPARATUS

(71) Applicant: Yoji Makino, Kanagawa (JP)

(72) Inventor: Yoji Makino, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 270 days.

This patent is subject to a terminal disclaimer.

(21) Appl. No.: 18/636,221

(22) Filed: Apr. 15, 2024

(65) Prior Publication Data

US 2024/0354535 A1 Oct. 24, 2024

(30) Foreign Application Priority Data

Apr. 24, 2023 (JP) ................................ 2023-071034

(51) Int. Cl.

*G06K 15/02* (2006.01)
*G06K 15/00* (2006.01)
*G06T 7/90* (2017.01)

(52) U.S. Cl.

CPC ....... *G06K 15/1878* (2013.01); *G06K 15/005* (2013.01); *G06T 7/90* (2017.01); *G06T 2207/10024* (2013.01); *G06T 2207/20104* (2013.01)

(58) Field of Classification Search

USPC ........................................................ 358/1.15
See application file for complete search history.

(56) References Cited

U.S. PATENT DOCUMENTS

| | | | | |
|---|---|---|---|---|
| 11,775,238 | B2 * | 10/2023 | Makino | H04N 1/00034 358/1.9 |
| 2016/0277642 | A1 | 9/2016 | Kuwada et al. | |
| 2018/0001658 | A1 * | 1/2018 | Gracia Verdugo | H04N 1/6044 |
| 2021/0266422 | A1 | 8/2021 | Kikuta et al. | |
| 2021/0325175 | A1 * | 10/2021 | Morovic | G01B 11/24 |
| 2023/0067117 | A1 | 3/2023 | Nakamura | |
| 2023/0135640 | A1 | 5/2023 | Makino | |
| 2024/0022677 | A1 * | 1/2024 | Watanabe | H04N 1/00082 |

FOREIGN PATENT DOCUMENTS

| | | | |
|---|---|---|---|
| EP | 4175272 | A1 | 5/2023 |
| JP | 2014-082618 | A1 | 5/2014 |
| JP | 2014-155124 | A | 8/2014 |
| JP | 2016-001843 | A | 1/2016 |
| JP | 2023-067715 | A | 5/2023 |

OTHER PUBLICATIONS

European Search Report; Application EP24170600; Sep. 3, 2024.

* cited by examiner

*Primary Examiner* — Jacky X Zheng
(74) *Attorney, Agent, or Firm* — Duft & Bornsen, PC

(57) ABSTRACT

An image forming apparatus includes circuitry that extracts a colorimetric area from an area in which an image is to be formed, and calculates a color difference between a first page and a second page and determine whether to continue printing based on the calculated color difference. The first page is a page that is printed in advance with a print job for one copy and for which a colorimetric value in the colorimetric area is registered as a reference value. The second page is a page that is repeatedly printed with the print job for a plurality of copies.

17 Claims, 17 Drawing Sheets

1700

COLOR MANAGEMENT FOR AN IMAGE FORMING APPARATUS

CROSS-REFERENCE TO RELATED APPLICATIONS

This patent application is based on and claims priority pursuant to 35 U.S.C. § 119(a) to Japanese Patent Application No. 2023-071034, filed on Apr. 24, 2023, in the Japan Patent Office, the entire disclosure of which is hereby incorporated by reference herein.

BACKGROUND

Technical Field

The present disclosure relates to an image forming apparatus, an image forming system, an image forming method, and a non-transitory recording medium.

Related Art

Techniques are available for correcting the gradation of a color used by an image forming apparatus for printing. For example, a known color stabilization process may involve scanning a printed material printed by an image forming apparatus by using a sensor to read a color of the printed material, comparing the read color with a target color, and correcting the gradation of image data to be printed.

SUMMARY

Example embodiments include an image forming apparatus including circuitry configured to extract a colorimetric area from an area in which an image is to be formed, and calculate a color difference between a first page and a second page and determine whether to continue printing based on the calculated color difference. The first page is a page that is printed in advance with a print job for one copy and for which a colorimetric value in the colorimetric area is registered as a reference value. The second page is a page that is repeatedly printed with the print job for a plurality of copies.

Example embodiments include an image forming system including an image forming apparatus including circuitry, and an information processing apparatus to transmit print job data including image data to the image forming apparatus. The circuitry extracts a colorimetric area from an area in which an image is to be formed based on the image data, and calculates a color difference between a first page and a second page and determine whether to continue printing, based on the calculated color difference. The first page is a page that is printed in advance with a print job for one copy and for which a colorimetric value in the colorimetric area is registered as a reference value. The second page is a page that is repeatedly printed with the print job for a plurality of copies.

Example embodiments include an image forming method including: extracting a colorimetric area from an area in which an image is to be formed; calculating a color difference between a first page and a second page; and determining whether to continue printing, based on the calculated color difference. The first page is a page that is printed in advance with a print job for one copy and for which a colorimetric value in the colorimetric area is registered as a reference value. The second page is a page that is repeatedly printed with the print job for a plurality of copies.

Example embodiments include a non-transitory recording medium storing a plurality of instructions which, when executed by one or more processors, causes the processors to perform an image forming method including: extracting a colorimetric area from an area in which an image is to be formed; calculating a color difference between a first page and a second page; and determining whether to continue printing based on the calculated color difference. The first page is a page that is printed in advance with a print job for one copy and for which a colorimetric value in the colorimetric area is registered as a reference value. The second page is a page that is repeatedly printed with the print job for a plurality of copies.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
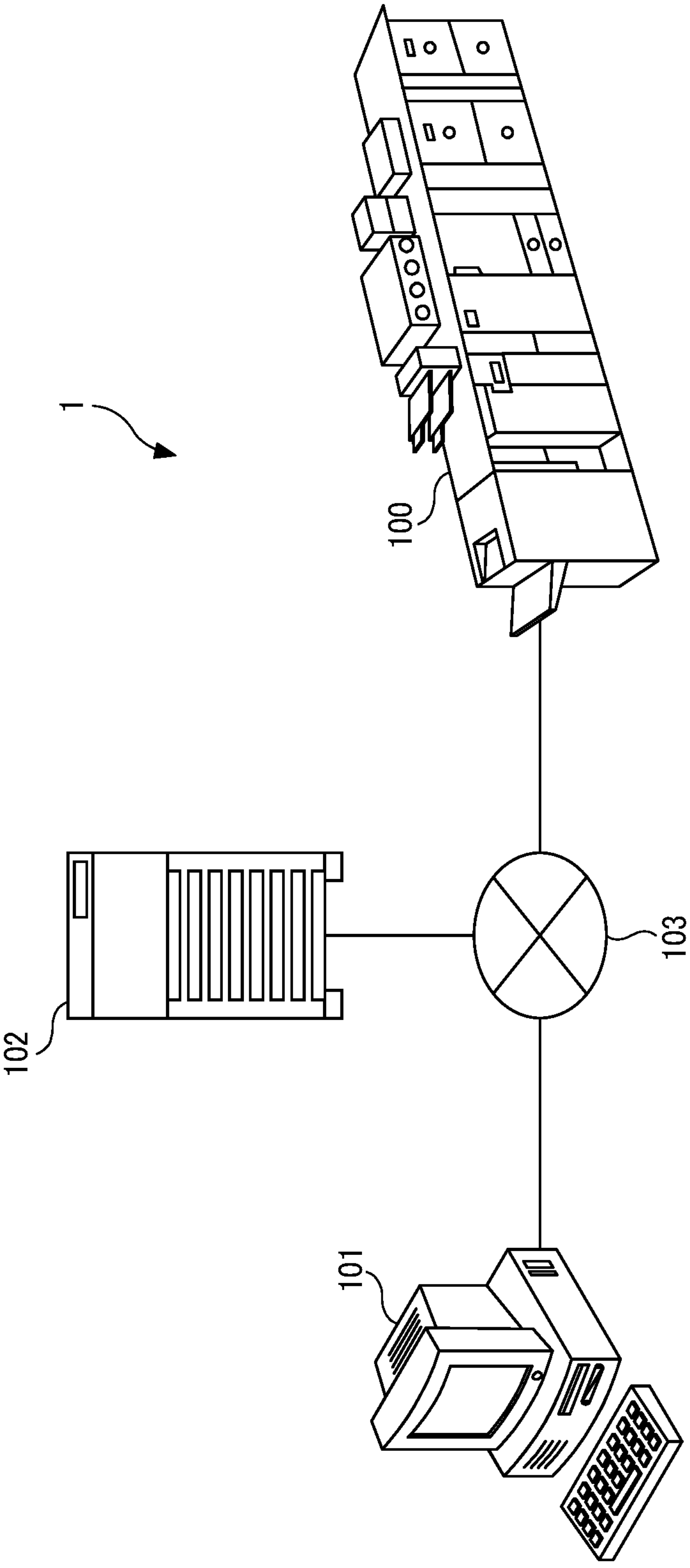
FIG. 1 is a diagram illustrating an example system configuration of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure (present embodiment) will be described in detail hereinafter with reference to the drawings.

First Embodiment

System Configuration

FIG. 1 is a diagram illustrating an example system configuration of an image forming system 1 according to an embodiment. The image forming system 1 includes, for example, an image forming apparatus 100, a user terminal 101, and a server 102. The image forming apparatus 100, the user terminal 101, and the server 102 are communicably connected to each other via a communication network 103 such as the Internet or a local area network (LAN), for example.

The image forming apparatus 100 is an apparatus for forming an image, and examples of the image forming apparatus 100 include a color production printer, a laser printer, and an inkjet printer. In one example, the image forming apparatus 100 receives image data from, for example, the user terminal 101 or the server 102 and executes an image forming process (print process) for printing an image on a sheet, which is a recording medium, based on the received image data.

The user terminal 101 is a terminal that issues an instruction to print an image in accordance with an operation by a user. For example, the user terminal 101 transmits print job data including image data to the image forming apparatus 100 or the server 102.

The server 102 is an information processing apparatus having the configuration of a computer or is a system including a plurality of computers. The server 102 manages, for example, print job data and color profiles. For example, in response to receipt of print job data from the user terminal 101, the server 102 adds the received print job data to a queue in a storage unit that stores print job data waiting to be printed. The server 102 extracts print job data from the queue in the order in which print job data is added to the queue or in accordance with a priority set as appropriate, and transmits the extracted print job data to the image forming apparatus 100. The user terminal 101 and the server 102 are examples of an information processing apparatus that transmits print job data including image data to an image forming apparatus.

In the image forming apparatus 100 for printing a plurality of printed materials, for example, it is desired to stabilize an output color in continuous output of several hundreds or several thousands of sheets. In particular, in a use case such as repetitive printing of documents of the same type, such as leaflets or catalogs whose content is slightly changed on a page-by-page basis, it is desired to stably manage reproduced colors.

However, unlike full-scale commercial printing business, the operating environment in which the image forming system 1 is used may not be fully managed. In addition, the image forming system 1 has unavoidably unstable factors such as continuous changes in the amounts of toner and ink to be supplied and continuous changes in machine conditions due to, for example, mixed printing of documents of various types.

It is therefore difficult to stably manage colors in, for example, photographic areas on images of printed materials that are continuously printed in large quantities or areas in which colors are to be managed, such as a design image and a corporate logo. For example, calibration may be used to perform color adjustment for the image forming apparatus 100 to adjust the colors of the image forming apparatus 100 to desired colors in advance. Even in this case, the adjusted colors may change after the image forming apparatus 100 is left unattended for several hours, due to changes in machine conditions, for example. Accordingly, when a job is printed after the image forming apparatus 100 is left unattended, continuous printing may be started, and, at the beginning of the printing, colors of printed materials may be undesirable. In addition, the colors may also change due to color variation during printing. If the printing is completed with considerable color variation intact, many unacceptable printed materials with considerable color variation may be generated.

According to one or more embodiments in the following, it is less likely that an image forming apparatus that prints a plurality of printed materials generates an unacceptable printed material with considerable color variation, which is caused by, for example, a change in the condition of the image forming apparatus and color variation during printing.

The image forming apparatus 100 according to the present embodiment repeatedly prints a print image by printing a job of one copy in advance, extracting an area where color measurement is available on the image of each page of the printed job, and registering color information of the area as a reference value. The image forming apparatus 100 repeatedly prints a plurality of copies of the same job by comparing items of color information obtained by color measurement of corresponding image areas on the same page in the first and subsequent copies to provide a color difference and suspending the printing operation when the color difference exceeds a preset color-difference threshold. Accordingly, the user is allowed to determine whether to interrupt or continue the printing and is allowed to perform an operation to interrupt or continue the printing. As a result, unacceptable printed materials with considerable color variation are less likely to be generated. In other words, the waste of printed materials may be reduced.

Hardware Configuration

Internal Structure of Image Forming Apparatus

Figure 2:
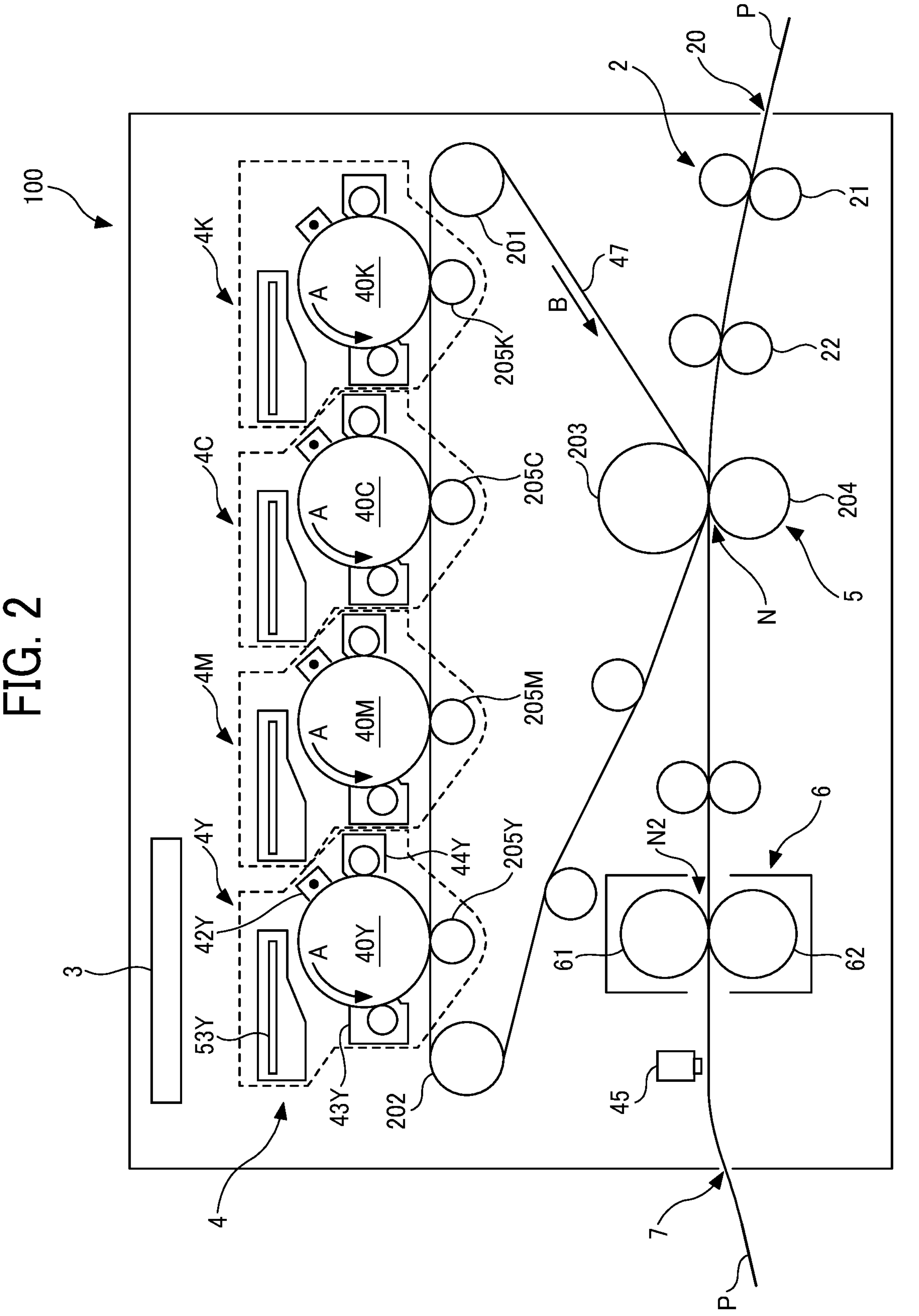
FIG. 2 is a diagram illustrating the internal structure of an image forming apparatus according to a first embodiment of the present disclosure.

FIG. 2 illustrates the internal structure of the image forming apparatus 100 according to an embodiment. The image forming apparatus 100 includes, for example, an image forming mechanism 4, a sheet feeder 2, a transfer unit 5, a fixing unit 6, a measurement sensor 45, and a sheet ejection unit 7.

The sheet feeder 2 conveys a sheet P to the image forming mechanism 4. The sheet feeder 2 includes, for example, a sheet feeding port 20, a sheet feeding roller 21, and a registration roller pair 22. The sheet feeding port 20 is an opening through which the sheet P is fed into the image forming mechanism 4. The sheet feeding roller 21 is a roller for conveying the sheet P fed through the sheet feeding port 20 to the transfer unit 5. The registration roller pair 22 is a pair of rollers for delivering the sheet P conveyed from the sheet feeding roller 21 to the transfer unit 5 at a predetermined timing.

The image forming mechanism 4 forms an image on the sheet P. The image forming mechanism 4 includes four process units, namely, a process unit 4Y, a process unit 4M, a process unit 4C, and a process unit 4K. The process units 4Y, 4M, 4C, and 4K correspond to respective colors of yellow (Y), magenta (M), cyan (C), and black (K), which are a plurality of basic colors of toner images to be transferred to a transfer belt 47. The process units 4Y, 4M, 4C, and 4K include drum-shaped photoconductors 40Y, 40M, 40C, and 40K, which are image bearers, respectively. The process units 4Y, 4M, 4C, and 4K have similar configurations. The configuration of the process unit 4Y corresponding to yellow (Y) will be described to avoid redundancy.

The process unit 4Y includes the photoconductor 40Y, a charging device 42Y, a laser unit 53Y, a developing device 43Y, a primary transfer roller 205Y, and a cleaning device 44Y. The photoconductor 40Y is a drum-shaped member, which is an image bearer serving as a rotating member that rotates in a direction A, which is a counterclockwise direction illustrated in FIG. 2. The photoconductor 40Y includes a photosensitive layer, which is a surface to be scanned with scanning light emitted from the laser unit 53Y. The charging device 42Y is a device that charges the photoconductor 40Y. The laser unit 53Y is a unit that emits scanning light to the photoconductor 40Y to form a latent image on the photoconductor 40Y.

The developing device 43Y is a device that develops the latent image formed on the photoconductor 40Y by the laser unit 53Y with yellow (Y) toner to form a toner image. The primary transfer roller 205Y is a roller that transfers the toner image formed on the photoconductor 40Y to the transfer belt 47 wound around a plurality of rollers including the primary transfer roller 205Y. The cleaning device 44Y is a device that removes excess toner remaining on the photoconductor 40Y after the toner image is transferred to the transfer belt 47.

In the image forming mechanism 4, the process units 4Y, 4M, 4C, and 4K, each having the configuration described above, form a toner image, which is an image of mixed colors containing a mixture of the basic colors, on the transfer belt 47, based on input document data (input image).

The transfer unit 5 transfers the toner image formed on the transfer belt 47 onto the sheet P. The transfer unit 5 includes the transfer belt 47, a drive roller 201, a driven roller 202, and a secondary transfer roller 203. The transfer belt 47 is a belt that is made of less-stretchable polyimide resin in which carbon powder is dispersed to adjust electrical resistance. The transfer belt 47 is wound around the drive roller 201, the driven roller 202, the secondary transfer roller 203, and the primary transfer roller 205Y, a primary transfer roller 205M, a primary transfer roller 205C, and a primary transfer roller 205K.

The drive roller 201 is driven by a driving source to rotate in a direction B in FIG. 2. The driven roller 202 rotates in the direction B in a manner similar to that of the drive roller 201.

The secondary transfer roller 203 is a roller that comes into contact with an opposing roller 204 at a secondary transfer position N with the transfer belt 47 therebetween to form a nip. At the secondary transfer position N, the transfer belt 47 is nipped together with the sheet P between the secondary transfer roller 203 and the opposing roller 204, and the secondary transfer roller 203 applies a secondary transfer bias to transfer the toner image on the surface of the transfer belt 47 onto the sheet P. The secondary transfer bias to be applied is a charge having a polarity opposite to the polarity of static charge on the surface of the transfer belt 47. The sheet P onto which the toner image is transferred at the secondary transfer position N is conveyed to the fixing unit 6.

The measurement sensor 45 measures reflection characteristics of the image fixed on the sheet P. The measurement sensor 45 is an in-line chromaticity measurement device including a combination of multiple monochrome line sensors. In the preceding stages of the multiple monochrome line sensors, band-pass filters each corresponding to one of three colors to be measured, namely, red (R), green (G), and blue (B), are disposed to provide the multiple monochrome line sensors with sensitivity to the three colors.

The measurement sensor 45 includes measurement channels having three spectral characteristics each corresponding to one of three colors of red (R), green (G), and blue (B). The number of measurement channels included in the measurement sensor 45 is referred to as "measurement channel number". The measurement sensor 45 is located downstream of a fixing nip N2 of the fixing unit 6 in the direction of conveyance of the sheet P, and measures reflection characteristics of part of or the entirety of the image (color image) formed on the sheet P.

In one example, the measurement sensor 45 includes a measurement channel having at least one spectral characteristic. In other words, the measurement sensor 45 includes a measurement channel having sensitivity to one or more basic colors. For example, the measurement sensor 45 is a so-called color scanner. In another example, the measurement sensor 45 is a monochrome line sensor having a single spectral characteristic.

The fixing unit 6 fixes the image on the sheet P transferred by the transfer unit 5. When the sheet P bearing the toner image passes through the fixing nip N2, which is formed between a heating roller 61 and a fixing roller 62, the fixing unit 6 fixes the toner image borne on the sheet P by the action of heat and pressure and forms a good color image on the sheet P. The sheet P having passed through the fixing unit 6 and having the toner image fixed thereon is ejected from the sheet ejection unit 7 to the outside of the image forming mechanism 4.

The sheet ejection unit 7 ejects the sheet P to the outside. In one embodiment, the sheet ejection unit 7 includes a switching pawl and a duplex unit and conveys the sheet P into the duplex unit in accordance with a mode of the switching pawl, thereby forming images on both sides of the sheet P.

Hardware Configuration of Image Forming Apparatus

Figure 3:
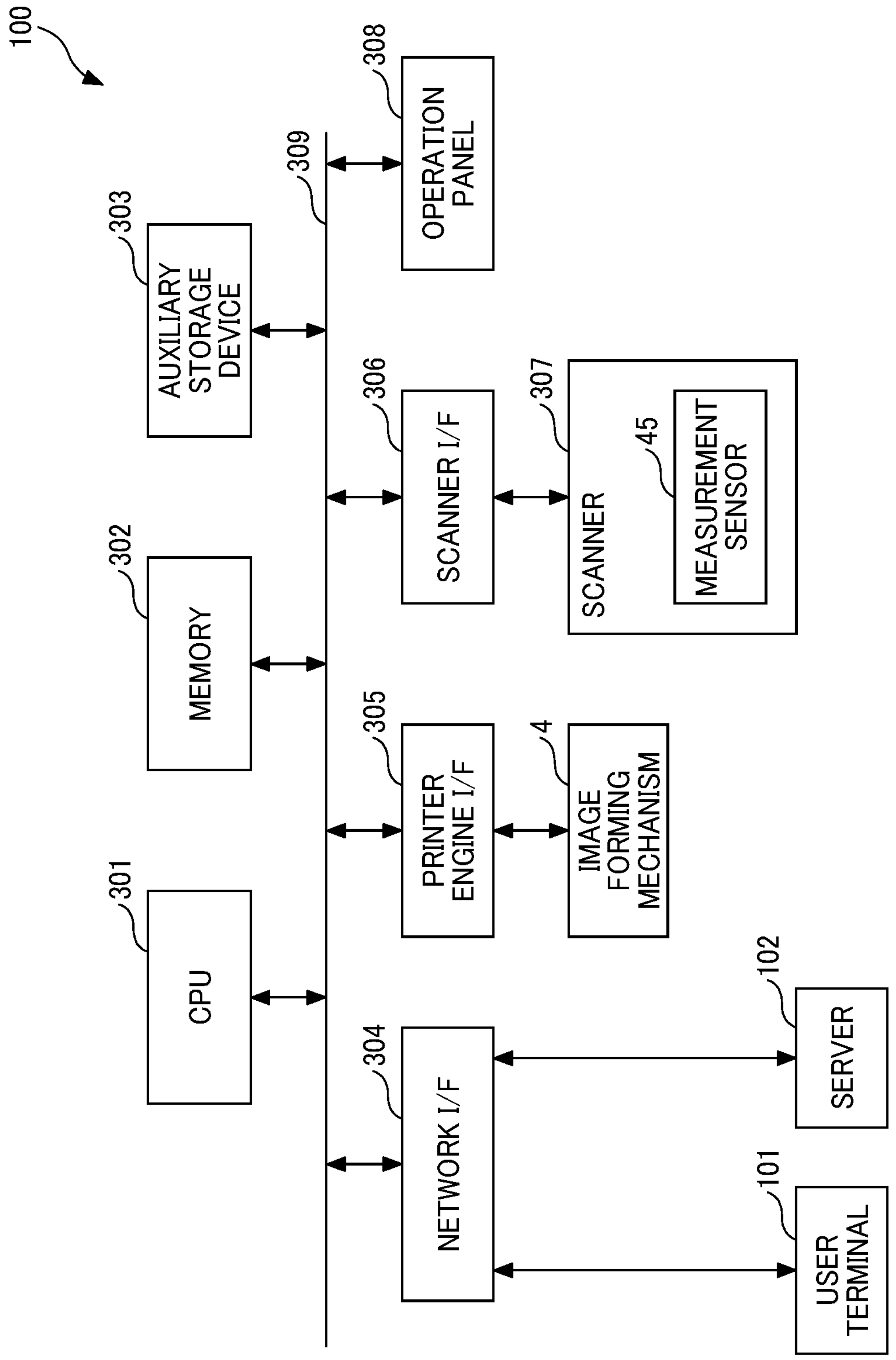
FIG. 3 is a block diagram illustrating an example hardware configuration of the image forming apparatus according to the first embodiment of the present disclosure.

FIG. 3 is a block diagram illustrating an example hardware configuration of the image forming apparatus 100 according to an embodiment. The image forming apparatus 100 includes, for example, a central processing unit (CPU) 301, a memory 302, an auxiliary storage device 303, a network interface (I/F) 304, a printer engine I/F 305, the image forming mechanism 4, a scanner I/F 306, a scanner 307, and an operation panel 308. The CPU 301, the memory 302, the auxiliary storage device 303, the network I/F 304, the printer engine I/F 305, the scanner I/F 306, and the operation panel 308 are connected to each other via a bus 309 to communicate data to each other.

The CPU 301 is an arithmetic unit (processor) that controls the overall operation of the image forming apparatus 100. The memory 302 includes, for example, a read only memory (ROM) that stores a program such as firmware, and a random access memory (RAM), which is used as a work area during arithmetic processing by the CPU 301. The auxiliary storage device 303 is a large-capacity storage device such as a hard disk drive (HDD), a solid state drive (SSD), or a flash memory and stores, for example, an operating system (OS), various programs, print data, and color profiles.

The network I/F 304 is a communication interface for connecting the image forming apparatus 100 to the communication network 103 to communicate with an external device. The printer engine I/F 305 is an interface that allows the devices of the image forming apparatus 100 to communicate with the image forming mechanism 4. The scanner I/F 306 is an interface that allows the devices of the image forming apparatus 100 to communicate with the scanner 307. The scanner 307 is a device that reads an image on the sheet P by using the functions of the measurement sensor 45.

The operation panel 308 includes, for example, a display device for displaying various display screens, and an input device for receiving an input operation by the user. The hardware configuration of the image forming apparatus 100 illustrated in FIG. 3 is an example. The image forming apparatus 100 may include other components.

Hardware Configuration of Computer

Figure 4:
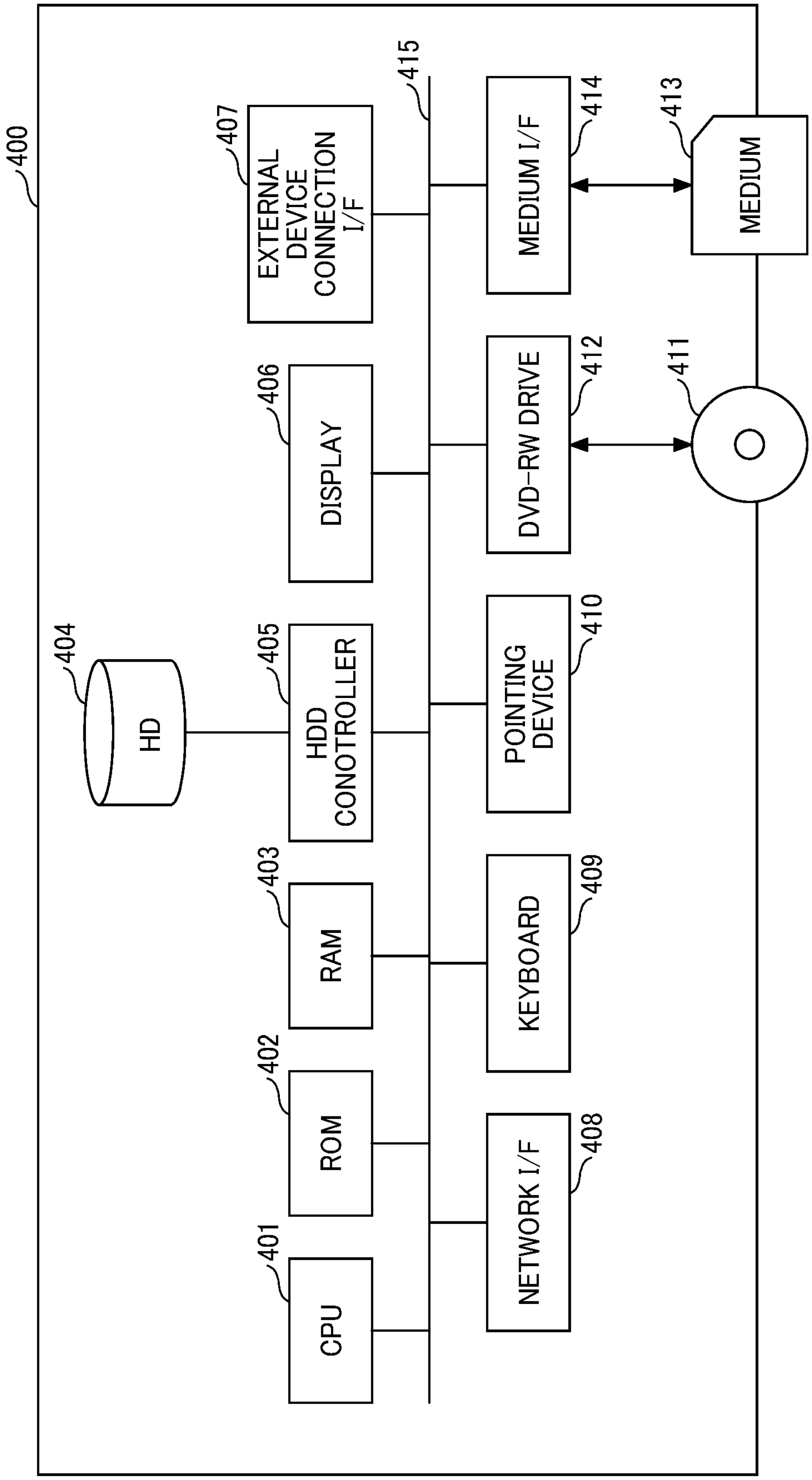
FIG. 4 is a block diagram illustrating an example hardware configuration of a computer according to an embodiment of the present disclosure.

The user terminal 101 and the server 102 have, for example, the hardware configuration of a computer 400 as illustrated in FIG. 4. In another embodiment, the server 102 includes multiple computers 400, each having the hardware configuration illustrated in FIG. 4.

FIG. 4 is a block diagram illustrating an example hardware configuration of the computer 400 according to an embodiment. As illustrated in FIG. 4, the computer 400 includes, for example, a CPU 401, a ROM 402, a RAM 403, a hard disk (HD) 404, an HDD controller 405, a display 406, an external device connection I/F 407, a network I/F 408, a keyboard 409, a pointing device 410, a digital versatile disc rewritable (DVD-RW) drive 412, a medium I/F 414, and a bus line 415.

The CPU 401 controls the overall operation of the computer 400. The ROM 402 stores, for example, a program used to activate the computer 400, such as a start-up file, and data. The RAM 403 is used as, for example, a work area for the CPU 401. The HD 404 stores, for example, various data and programs such as an OS, an application, and a device drive. The HDD controller 405 controls, for example, reading or writing of various data from or to the HD 404 under the control of the CPU 401.

The display 406 displays various types of information such as a cursor, a menu, a window, text, or an image, for example. The display 406 may be external to the computer 400. The external device connection I/F 407 is an interface for connecting an external device to the computer 400. The network I/F 408 is an interface for performing data communication using the communication network 103.

The keyboard 409 is an example of an input means including a plurality of keys used to input, for example, characters, numerical values, and various instructions. The pointing device 410 is an example of an input means used to select or execute various instructions, select a target for processing, or move the cursor being displayed, for example. The keyboard 409 and the pointing device 410 may be external to the computer 400.

The DVD-RW drive 412 controls reading or writing of various data from or to a DVD-RW 411, which is an example of a removable recording medium. The DVD-RW 411 may be implemented by a removable recording medium other than a DVD-RW. The medium I/F 414 controls reading or writing (storing) of data from or to a medium 413 such as a flash memory. The bus line 415 includes, for example, an address bus, a data bus, and various control signal buses for electrically connecting the components described above. The hardware configuration of the computer 400 illustrated in FIG. 4 is an example.

Functional Configuration

Functional Configuration of Image Forming Apparatus

Figure 5:
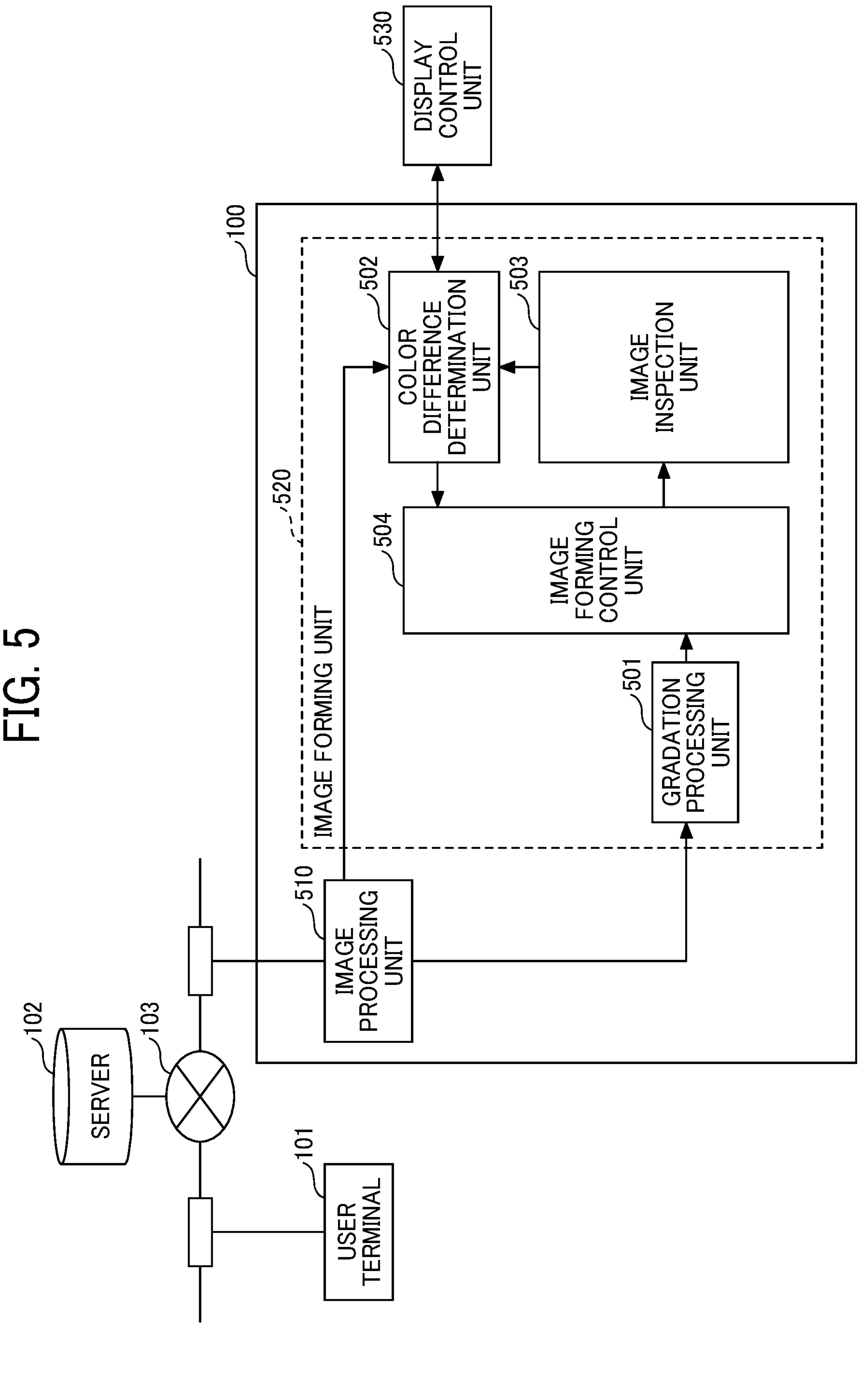
FIG. 5 is a schematic diagram illustrating the functional configuration of the image forming apparatus according to the first embodiment of the present disclosure.

FIG. 5 is a schematic diagram illustrating the functional configuration of the image forming apparatus 100 according to an embodiment. The image forming apparatus 100 includes, for example, an image processing unit 510, an image forming unit 520, and a display control unit 530.

The image processing unit 510 performs image processing of converting document data received from the user terminal 101 or the server 102 via the communication network 103 into a format printable by the image forming mechanism 4. Examples of the document data include bitmap data designated in colors of red, green, and blue (RGB) or cyan, magenta, yellow, and black (CMYK), text data, and data represented in a data format including, for example, an instruction for drawing graphics.

The image processing unit 510 converts the document data subjected to the image processing into image data having a pixel array (bitmap data or an equivalent compression format) made of the basic colors of the image forming mechanism 4. The image processing unit 510 sends the converted image data to a gradation processing unit 501.

The image forming unit 520 includes, for example, the gradation processing unit 501, a color difference determination unit 502, an image inspection unit 503, and an image forming control unit 504. The gradation processing unit 501 converts the image data converted by the image processing unit 510 and having the pixel array into image data having a number of gradations supported by the image forming mechanism 4.

The image inspection unit 503 detects (reads) an image from the sheet P printed out by the image forming mechanism 4 by using the scanner 307 in an in-line format. In one example, the image inspection unit 503 controls the measurement sensor 45 of the scanner 307 to detect an image. The measurement sensor 45 emits light to an image formed by the image forming mechanism 4 and receives light reflected by the image to two-dimensionally measure the reflectance of the image from a surface and detect the reflectance as an image. In other words, detection of an image refers to measurement of colors of the image. The measurement of colors of the image may hereinafter be referred to as "colorimetry". The operation of the image inspection unit 503 will be described in detail below.

The color difference determination unit 502 compares colors of an image detected by the image inspection unit 503 for respective copies to calculate a color difference. Specifically, the color difference determination unit 502 calculates a color difference between a color of an image registered as a reference when print job data of one copy is printed in advance and a color of an image of the n-th copy that is printed thereafter among a plurality of set copies, where n is an integer greater than or equal to 1. When the calculated color difference exceeds a preset threshold, the color difference determination unit 502 notifies the image forming control unit 504 of the excess of the color difference over the threshold. The operation of the color difference determination unit 502 will be described in detail below.

The image forming control unit 504 controls image formation by the image forming mechanism 4. The image forming control unit 504 controls the image forming mechanism 4 to print an image on the sheet P, based on the image data converted by the gradation processing unit 501. Further, in response to receipt of a notification from, for example, the color difference determination unit 502, the image forming control unit 504 suspends the printing process and waits for an instruction from the user. In response to receipt of an instruction from the user to resume the printing process, the image forming control unit 504 resumes the printing process.

The gradation processing unit 501, the color difference determination unit 502, the image inspection unit 503, and the image forming control unit 504 are each implemented by the CPU 301 executing processing defined by a program loaded into the memory 302. In another example, some or all of the functions of the gradation processing unit 501, the color difference determination unit 502, the image inspection unit 503 (except for the scanner 307), and the image forming control unit 504 are implemented by a hardware circuit such as a field-programmable gate array (FPGA) or an application specific integrated circuit (ASIC).

The display control unit 530 executes a display control process for displaying various display screens described below on a display unit such as the operation panel 308, and receiving an operation by the user. The various display screens include, for example, but are not limited to, a colorimetric exclusion area designation screen, a colorimetric area designation screen, a color-difference excess message display screen, and a color difference information display screen.

The image processing unit 510 and the display control unit 530 are implemented by hardware including, for example, dedicated software and an extension board. The hardware implementing the image processing unit 510 and the display control unit 530 is independent of hardware implementing the image forming unit 520. With this configuration, the hardware implementing the image processing unit 510 is replaceable independently of the hardware implementing the image forming unit 520.

In another example, the image processing unit 510 and the display control unit 530 are implemented by a terminal separate from the image forming apparatus 100 as long as the terminal is configured to communicate with the hardware implementing the image forming unit 520. For example, the image processing unit 510 and the display control unit 530 may be implemented by the user terminal 101 or the server 102. In another example, the image processing unit 510 and the display control unit 530 are implemented by the hardware implementing the image forming unit 520.

Figure 6:
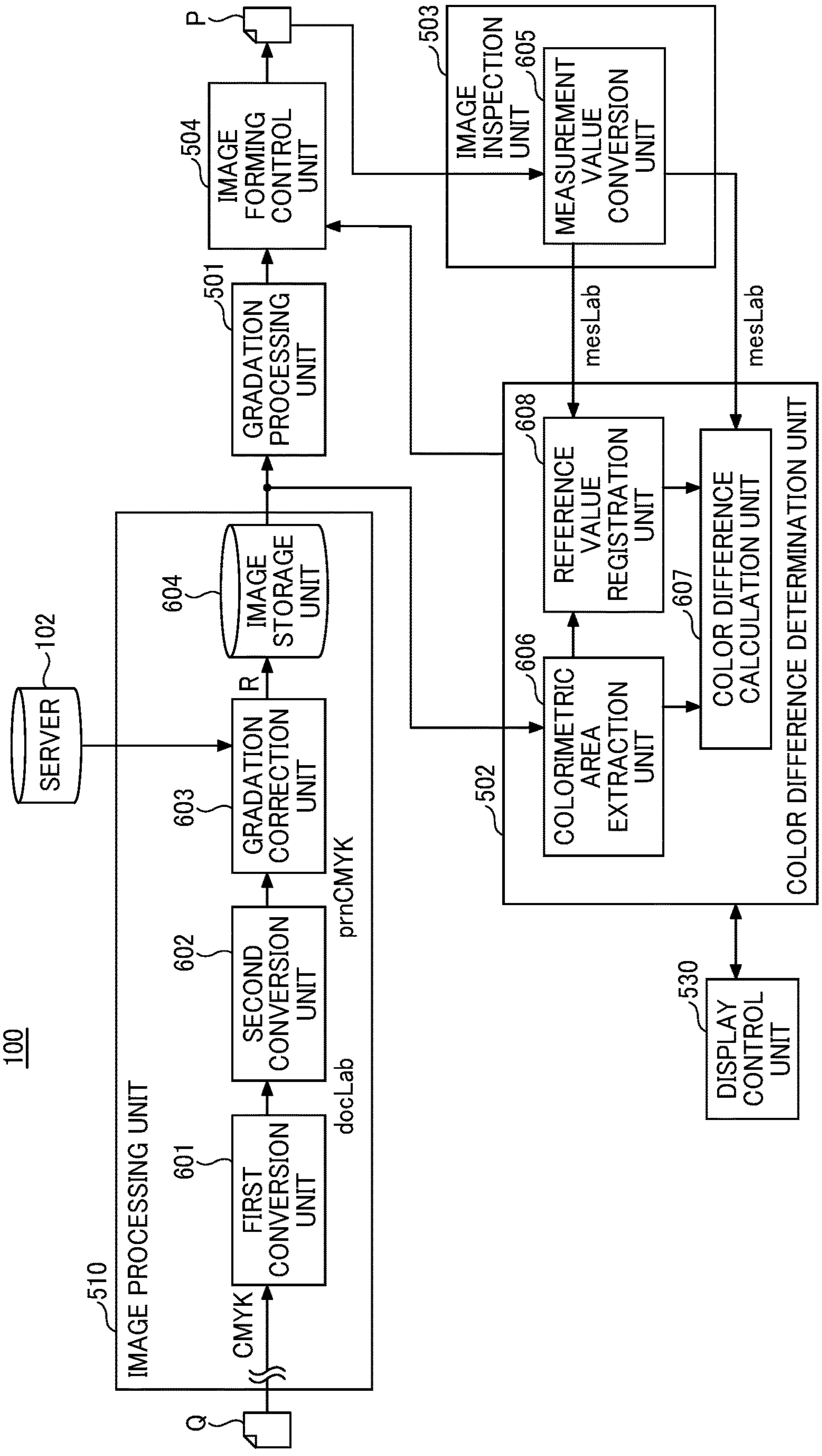
FIG. 6 is a detailed diagram illustrating the functional configuration of the image forming apparatus according to the first embodiment of the present disclosure.

FIG. 6 is a detailed diagram illustrating the functional configuration of the image forming apparatus 100 according to an embodiment. The image processing unit 510 includes, for example, a first conversion unit 601, a second conversion unit 602, a gradation correction unit 603, and an image storage unit 604.

The first conversion unit 601 converts document data Q into a Lab format. The second conversion unit 602 converts the Lab format into a CMYK format. The gradation correction unit 603 corrects gradation in accordance with a selected color profile. The data whose gradation has been corrected is referred to as "image data R". The image storage unit 604 stores various data, including the generated image data R, temporarily or continuously during image formation.

The image inspection unit 503 calculates a colorimetric value mesLab, based on a measurement value mesCol measured by the measurement sensor 45. In one example, the image inspection unit 503 includes a measurement value conversion unit 605 to convert the measurement value mesCol into the colorimetric value mesLab.

The color difference determination unit 502 calculates a color difference between a first page and a second page subsequent to the first page from a result of color measurement in an extracted colorimetric area, and determines whether to continue the printing, based on the calculated color difference. For example, the color difference determination unit 502 calculates a color difference between a first page that is printed in advance with a print job for one copy and for which a colorimetric value in the colorimetric area is registered as a reference value and a second page that is repeatedly printed with the print job for a plurality of copies. The first page and the second page are different pages included in the print job. In one example, when the print job includes a plurality of copies, the first page and the second page are pages included in different copies and having the same page number. For example, the first page is a page included in the first copy of the print job printed in advance. The second page is a page having the same page number as the first page and included in the n-th copy or a subsequent copy of the print job set to include a plurality of copies and printed, where n is an integer greater than or equal to 1.

The color difference determination unit 502 includes, for example, a colorimetric area extraction unit 606, a color difference calculation unit 607, and a reference value registration unit 608. The colorimetric area extraction unit 606 extracts a colorimetric area from an area in which an image to be printed is to be formed. For example, the colorimetric area extraction unit 606 analyzes a change in the gradation of an image included in the image data R and extracts, for example, an area having a small change in gradation as an area suitable for colorimetry.

In one example, the colorimetric area extraction unit 606 sets an area designated by the user on a colorimetric area designation screen displayed by the display control unit 530 as a colorimetric area. In another example, the colorimetric area extraction unit 606 sets an exclusion area designated by the user on a colorimetric exclusion area designation screen displayed by the display control unit 530 as a colorimetric exclusion area. In response to the user designating a colorimetric exclusion area, the colorimetric area extraction unit 606 extracts a colorimetric area from an area other than the colorimetric exclusion area in an image area of the image data R.

The color difference calculation unit 607 calculates, as a color difference, a difference between a reference colorimetric value in the colorimetric area for the print job for which one copy is printed in advance and a colorimetric value of the print job serving as a determination target and set to include a plurality of copies. The reference value registration unit 608 registers, as a reference value, a colorimetric value in a colorimetric area extracted in response to the print job for which one copy is printed in advance. In one example, the reference value registration unit 608 registers, in the image forming apparatus 100 in advance, colorimetric values mesLab of pages of the print job for one copy.

In one example, the color difference calculation unit 607 acquires, from the image inspection unit 503, colorimetric values mesLab of pages of a print job for one copy, which are registered in advance by the reference value registration unit 608, and colorimetric values mesLab of pages included in the n-th copy of the same print job set to include a plurality of copies and repeatedly printed. Further, the color difference calculation unit 607 calculates a color difference between the acquired colorimetric values mesLab. Details of the calculation process will be described below.

The operation of the functional components illustrated in FIG. 6 will further be described in accordance with a procedure for forming an image. The user terminal 101 or the server 102 transmits the document data Q and a print request to the image forming apparatus 100 via the communication network 103. The document data Q has a complicated data format including a bitmap designated in colors of, for example, RGB or CMYK, text, or an instruction for drawing graphics.

The image processing unit 510 expands the received document data Q and converts the document data Q into a pixel array of basic colors of cyan C, magenta M, yellow Y, and black K that the image forming mechanism 4 includes. For example, the image processing unit 510 converts the document data Q to bitmap data in which items of color information of pixels are arranged in a grid pattern.

The gradation processing unit 501 converts pixels included in the bitmap data into the number of gradations supported by the image forming mechanism 4. The image forming control unit 504 controls the image forming mechanism 4 to form an image on the sheet P, based on the image data R obtained by converting the number of gradations by the gradation processing unit 501.

The image inspection unit 503 scans the image formed on the sheet P by using reflection characteristics of the toner image detected by the measurement sensor 45, as described below. The color difference calculation unit 607 calculates a color difference between a colorimetric value mesLab of a print job for one copy, which is registered in advance in the reference value registration unit 608, in the colorimetric area extracted based on the colorimetric area extraction unit 606 and a colorimetric value mesLab of the same page and the same area included in the first copy or a subsequent copy of the same print job set to include a plurality of copies and repeatedly printed.

When the color difference between the colorimetric values exceeds a preset threshold, the color difference determination unit 502 instructs the image forming control unit 504 to suspend the printing. In one example, the display control unit 530 displays a color-difference excess message display screen and receives from the user an operation of selecting whether to continue or stop the printing. The image forming apparatus 100 continues or stops the printing in accordance with the selection operation by the user.

In the illustrated example, the color difference determination unit 502 handles a Lab (CIELab) format, and the image processing unit 510 converts the document data Q, which is color data in a CMYK format, into the Lab format. The Lab format is merely an example, and any color representation format that clarifies the amount of change in color may be used.

The first conversion unit 601, the second conversion unit 602, and the measurement value conversion unit 605 use basic data called color profiles for the respective color space conversions. Of the color profiles, a color profile to be used for conversion from a document color to a Lab value is attached to the document data Q or prepared in advance. A color profile used by the measurement value conversion unit 605 is set in advance in the image inspection unit 503.

The color profile used by the second conversion unit 602 is preferably set by selecting an appropriate color profile suitable for the type of the sheet P from among a plurality of color profiles stored in advance in the server 102 because color reproduction characteristics are affected by the type of the sheet P.

In one example, the image processing unit 510 changes the color profile based on the type of the sheet P in accordance with a selection operation by the user. In another example, the image processing unit 510 changes the color profile in accordance with the selection of the sheet P suitable for the input document data Q. The image processing unit 510 uses, as the color profile, an International Color Consortium (ICC) profile defined by the ICC, for example.

The detailed diagram of the functional configuration of the image forming apparatus 100 illustrated in FIG. 6 is an example. In one embodiment, for example, the colorimetric area extraction unit 606 and the reference value registration unit 608 are external to the color difference determination unit 502.

Operation Flow

Next, the operation flow of an image forming method according to the present embodiment will be described.

Reference Value Registration Process

Figure 7:
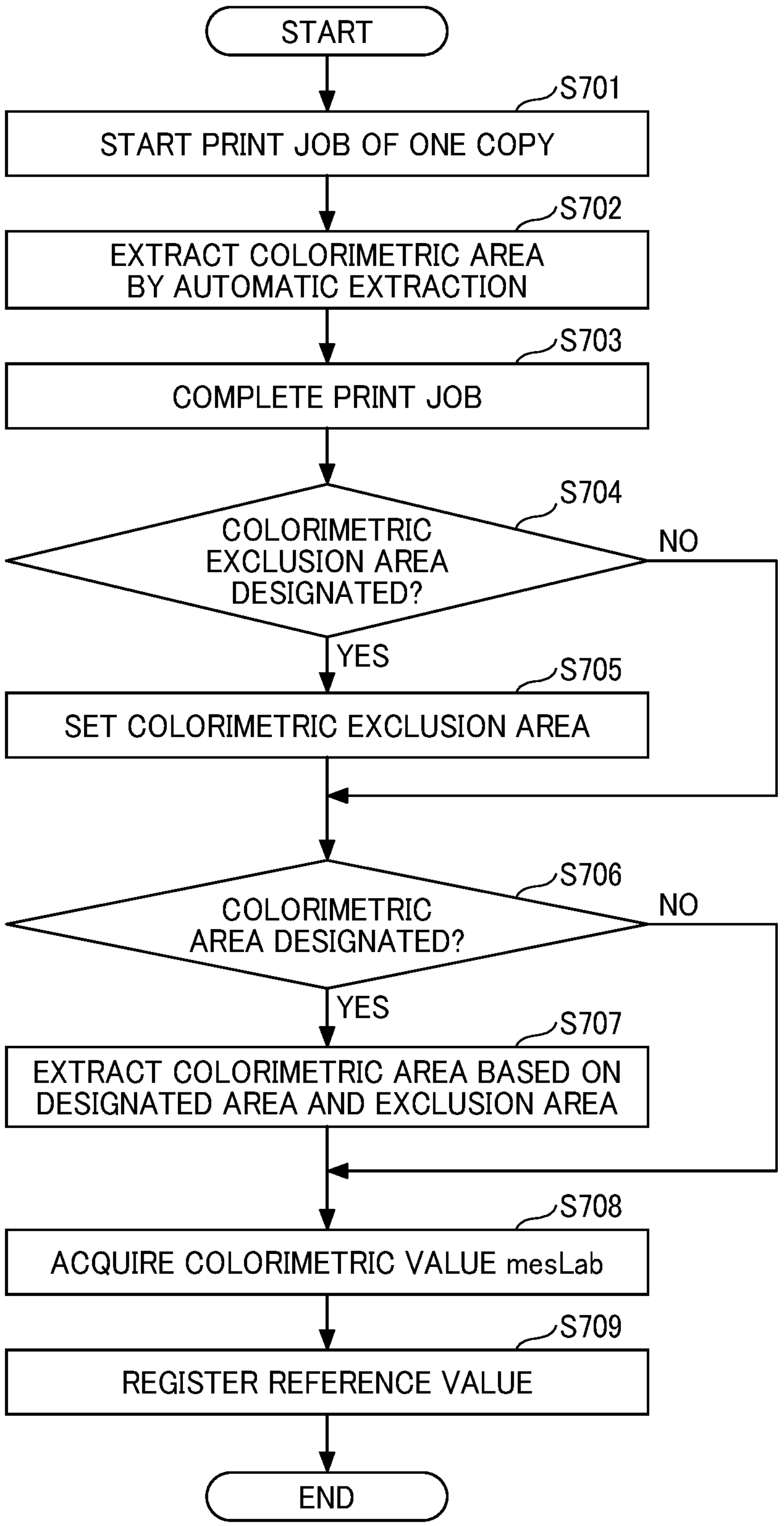
FIG. 7 is a flowchart illustrating an example of a reference value registration process according to an embodiment of the present disclosure.

FIG. 7 is a flowchart illustrating an example of a reference value registration process according to an embodiment. The illustrated process is an example of a reference value registration process for printing a print job of one copy in advance and registering a reference colorimetric value in the image forming apparatus 100.

In step S701, the image forming apparatus 100 starts printing one copy of a print job for which a reference value is to be registered, in accordance with an operation by the user.

In step S702, the colorimetric area extraction unit 606 of the image forming apparatus 100 automatically extracts a colorimetric area in response to starting of the printing process. The automatic extraction of the colorimetric area will be described below.

In step S703, the print job is completed. Then, in step S704, the colorimetric area extraction unit 606 determines whether a colorimetric exclusion area is designated in accordance with an operation by the user. If a colorimetric exclusion area is designated, the colorimetric area extraction unit 606 causes the process to proceed to step S705. On the other hand, if a colorimetric exclusion area is not designated, the colorimetric area extraction unit 606 causes the process to proceed to step S706. The colorimetric exclusion area is an area to be excluded from a color measurement target. The colorimetric exclusion area is designated by the user through, for example, a colorimetric exclusion area designation screen described below, when the user does not desire to perform colorimetry on an area that is part of an image in a page for which the colorimetry is to be performed.

In step S705, the colorimetric area extraction unit 606 sets the area designated by the user as a colorimetric exclusion area.

In step S706, the colorimetric area extraction unit 606 determines whether a colorimetric area is designated in accordance with an operation by the user. If a colorimetric area is designated, the colorimetric area extraction unit 606 causes the process to proceed to step S707. On the other hand, if a colorimetric area is not designated, the colorimetric area extraction unit 606 causes the process to proceed to step S708. The colorimetric area is an area for which the colorimetry is to be performed on the image in a page for which the colorimetry is to be performed. The colorimetric area is designated by the user through, for example, a colorimetric area designation screen described below, when the user desires to manage a color in an area of interest.

In step S707, the colorimetric area extraction unit 606 extracts a colorimetric area in accordance with designation information designated by the user among colorimetric exclusion area designation information and colorimetric area designation information.

In step S708, the reference value registration unit 608 of the image forming apparatus 100 acquires a colorimetric value mesLab in the extracted colorimetric area. In step S709, the reference value registration unit 608 registers the acquired colorimetric value mesLab in the image forming apparatus 100 as a reference value for each print job or each page.

Automatic Extraction of Colorimetric Area

Figure 8:
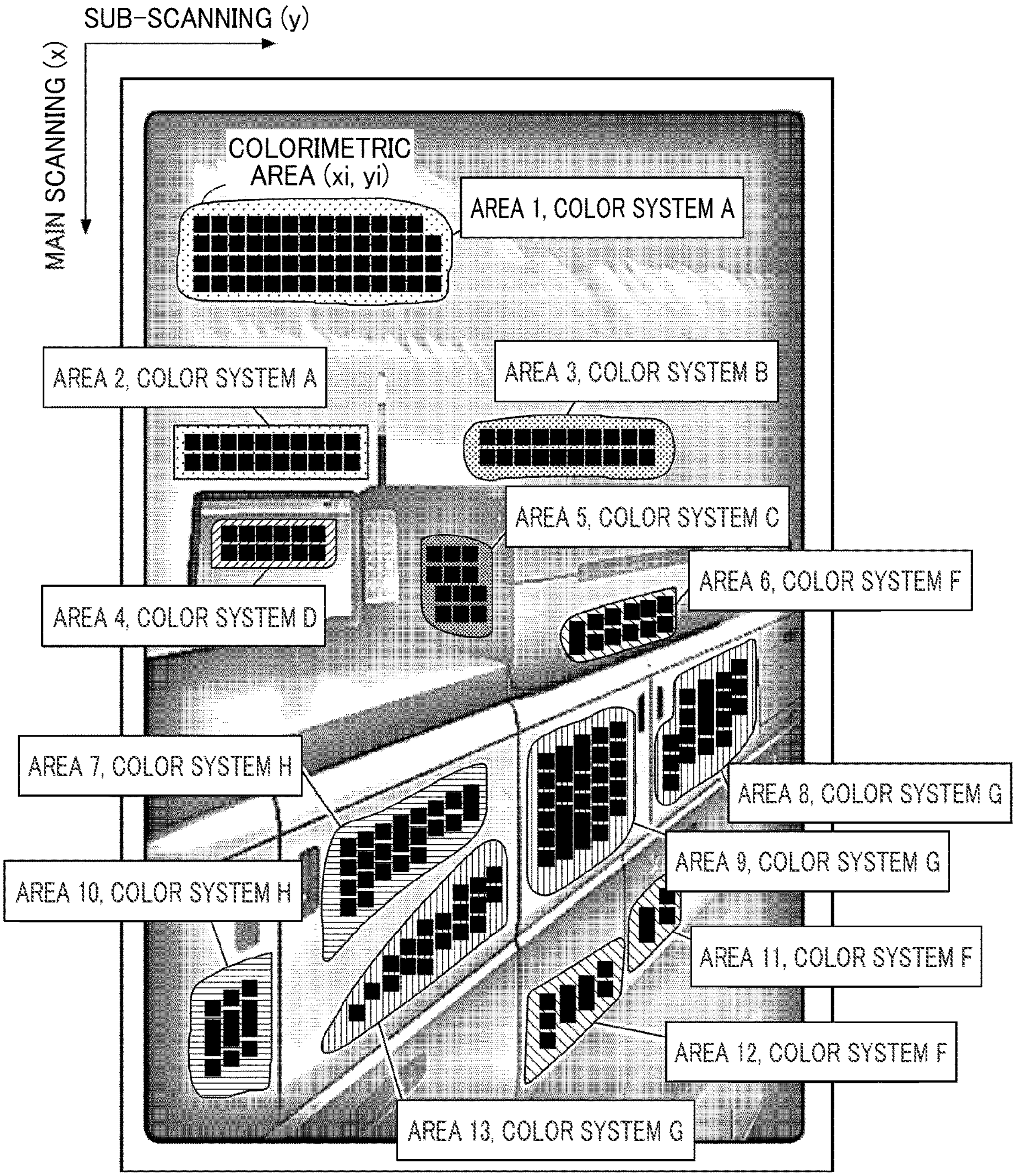
FIG. 8 is a diagram illustrating automatic extraction of a colorimetric area according to an embodiment of the present disclosure.

FIG. 8 is a diagram illustrating automatic extraction of a colorimetric area according to an embodiment. In step S702 illustrated in FIG. 7, the colorimetric area extraction unit 606 automatically extracts a colorimetric area.

FIG. 8 illustrates an example of a method for automatically extracting a colorimetric area from the image data R. In FIG. 8, colorimetric areas are extracted from a print area of the same color system. In FIG. 8, black squares represent N colorimetric areas (xi, yi) (i=1, . . . , N), which are automatically extracted from the print area by the colorimetric area extraction unit 606. Each of the colorimetric areas is a colorimetric area having a size of about several millimeters (mm) square, which is suitable for colorimetry. The colorimetric areas are arranged in an area with a small change in color gradation on the image to be formed. In the following description, the position of each of the colorimetric areas is represented by coordinates (x, y) of the center of the colorimetric area.

As used herein, the coordinate y corresponds to a sheet feeding direction in which the sheet P is conveyed in the image forming apparatus 100, that is, a sub-scanning direction, and the coordinate x corresponds to a direction orthogonal to the sub-scanning direction, that is, a main-scanning direction.

In one example, each colorimetric area is an area having a pixel size specified in advance. For example, each colorimetric area is an area of about 5 millimeters (mm) square, that is, an area of 41 pixels by 41 pixels in terms of 400 dots per inch (dpi). However, for example, when an area suitable for colorimetry is smaller than the pixel size specified in advance, the colorimetric area extraction unit 606 may extract an area having a smaller pixel size as a colorimetric area. For example, if it is determined that the area suitable for colorimetry is smaller than an area of about 5 millimeters (mm) square, the colorimetric area extraction unit 606 may extract an area of 21 pixels by 21 pixels as each of the colorimetric areas. This configuration allows acquisition of an appropriate amount of color variation that is less affected by a change in color due to a difference in color gradation on an image.

The colorimetric area extraction unit 606 extracts N colorimetric areas Ref(xi, yi) from a first copy, which is a copy to be printed first in a print job including one page or several consecutive pages. The color difference calculation unit 607 stores colorimetric values mesLab of the N colorimetric areas Ref(xi, yi) as reference values $mesLab_{Ref(p)(xi,\ yi)}$, where p represents a page.

Further, the color difference calculation unit 607 acquires, for each of the copies of a print job that is set to include a plurality of copies and that is to be repeatedly printed, starting from the first copy of the print job, N colorimetric areas Ref(p)(xi, yi) acquired and registered in advance and colorimetric values $mesLab_{Dif(nc)(p)(xi,\ yi)}$ of colorimetric areas Dif(nc)(p)(xi, yi), which are at the same positions on the same page as those of the N colorimetric areas Ref(p)(xi, yi), where nc represents the number of copies.

The color difference calculation unit 607 applies N colorimetric values $mesLab_{Dif(nc)(p)(xi,\ yi)}$, which are acquired for each copy, and the reference values $mesLab_{Ref\,(p)(xi,\ yi)}$ to the equation below to calculate a color difference ΔLab(nc)(p)(xi, yi).

$$\Delta \mathrm{Lab}(nc)(p)(xi,\ yi) = mesLab_{Dif(nc)(p)(xi,yi)} - mesLab_{Ref(p)(xi,yi)}$$

Then, the color difference determination unit 502 determines whether the calculated color difference ΔLab(nc)(p)(xi, yi) for each colorimetric area exceeds a preset color-difference threshold.

In one example, the color difference determination unit 502 organizes the color differences ΔLab(nc)(p)(xi, yi) calculated for the respective colorimetric areas by, as illustrated in FIG. 8, classifying the color differences by areas 1 to 13 and performs the determination based on a color difference calculated from the mean value of the colorimetric values $mesLab_{Dif(nc)(p)(xi,\ yi)}$ for the respective areas and the mean value of the reference values $mesLab_{Ref(p)(xi,\ yi)}$ for the respective areas.

In another example, the color difference determination unit 502 performs the classification by color systems (e.g., color systems A to H in FIG. 8) into, for example, a low-density range, a high-density range, and an intermediate-density range of each of blue, red, green, and gray. The color difference determination unit 502 performs the determination based on a color difference calculated from the mean value of the colorimetric values $mesLab_{Dif(nc)(p)(xi,\ yi)}$ and the mean value of the reference values $mesLab_{Ref(p)(xi,\ yi)}$ organized by the same color system.

This configuration enables the color difference determination on a per-area basis or a per-color-system basis. In addition, color variation is smoothed out in neighboring areas or the same color system. Accordingly, for example, a deviation error of variation due to density unevenness in a page that occurs in the image forming process is reduced, and more accurate color difference determination is achieved.

In another example, the color difference determination unit 502 calculates, for each page, the sum of the colorimetric values mesLabDif(nc)(p)(xi, yi) and the sum of the reference values mesLabRef(p)(xi, yi), calculates the mean values of the sums, and performs the determination using a color difference calculated from the mean values.

In another example, the color difference determination unit 502 calculates the value of color difference ΔE from the color difference ΔLab(nc)(p)(xi, yi) in accordance with a calculation formula defined by the International Commission on Illumination (CIE) and performs the determination based on the calculated color difference ΔE.

Designation of Colorimetric Exclusion Area

Figure 9:
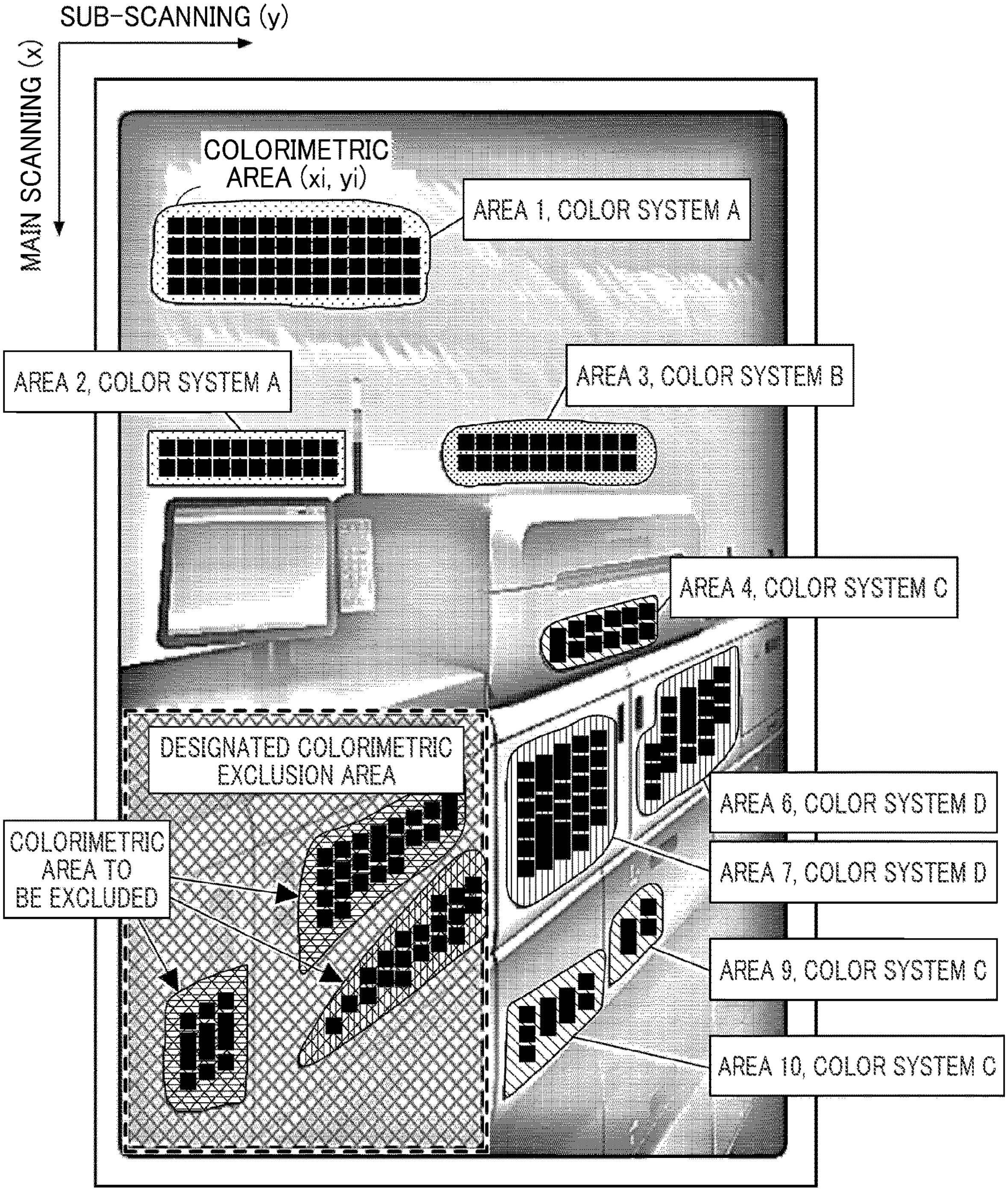
FIG. 9 is a diagram illustrating designation of a colorimetric exclusion area according to an embodiment of the present disclosure.

FIG. 9 is a diagram illustrating designation of a colorimetric exclusion area according to an embodiment. In FIG. 9, by way of example, the user who does not desire to perform colorimetry on an area that is part of an image in a page for which the colorimetry is to be performed designates an area on which the colorimetry is not to be performed as an exclusion area.

Variable data printing is a form of printing in which text or images may be changed in a desired area in any page from one printed copy to another without stopping or slowing down the printing process for multiple copies of a print job. When text or images are changed for one of continuously printed copies to another, the color configuration of an area in which text or images are changed is likely to vary, and such an area may be unsuitable for color management. For this reason, an area in which text or images are changed is desirably excluded from the colorimetric area.

Figure 10:
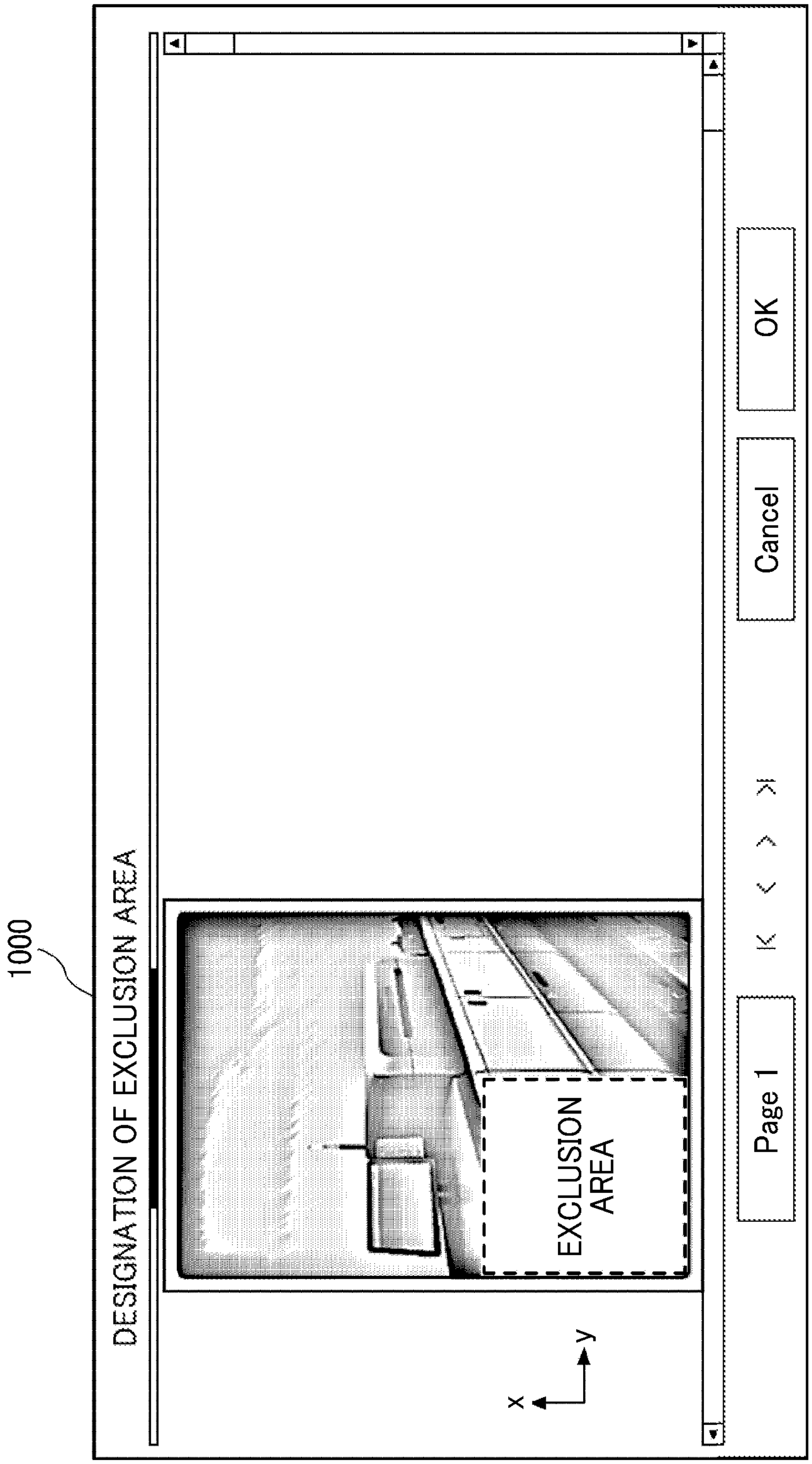
FIG. 10 is an illustration of an example of a colorimetric exclusion area designation screen according to an embodiment of the present disclosure.

Accordingly, for example, the display control unit 530 of the image forming apparatus 100 displays a colorimetric exclusion area designation screen 1000 as illustrated in FIG. 10 on a display unit such as the operation panel 308. In one example, the user uses an input device such as a mouse or a touch panel to surround an area on which colorimetry is not to be performed with a rectangular frame to designate the area. In the example illustrated in FIG. 10, one exclusion area illustrated in FIG. 9 is designated. In one embodiment, the colorimetric exclusion area designation screen 1000 allows the user to designate one or more areas.

In another embodiment, the colorimetric exclusion area designation screen 1000 allows the user to erase information on a designated area and designate another area. This addresses erroneous designation of an area by the user or a change of an incorrect area for which the user does not desire to perform color management.

Coordinate information of each of the designated areas is transmitted to the colorimetric area extraction unit 606. The colorimetric area extraction unit 606 extracts an area other than the colorimetric exclusion area as a colorimetric area, based on the transmitted coordinate information. The color difference determination unit 502 performs color difference determination based on a colorimetric value acquired in the extracted colorimetric area.

With this configuration, in a case where image information is changed from one of continuously printed copies to another, color difference determination is implemented based on colorimetry excluding a colorimetric area included in an area in which image information is changed.

In another embodiment, the colorimetric area extraction unit 606 stores information on an exclusion area designated in a print job. When the same print job is to be executed again after a certain period of time, the colorimetric area extraction unit 606 calls the stored information on the exclusion area and reuses the called information on the exclusion area. This enables color difference evaluation excluding the same area in the same print job at the time of reprinting.

In another embodiment, the colorimetric area extraction unit 606 receives at least one of designation of an exclusion area and designation of a colorimetric area to be added from the user based on an automatically extracted colorimetric area, and sets an area changed in accordance with the received designation as a colorimetric area.

Designation of Colorimetric Area

Figure 11:
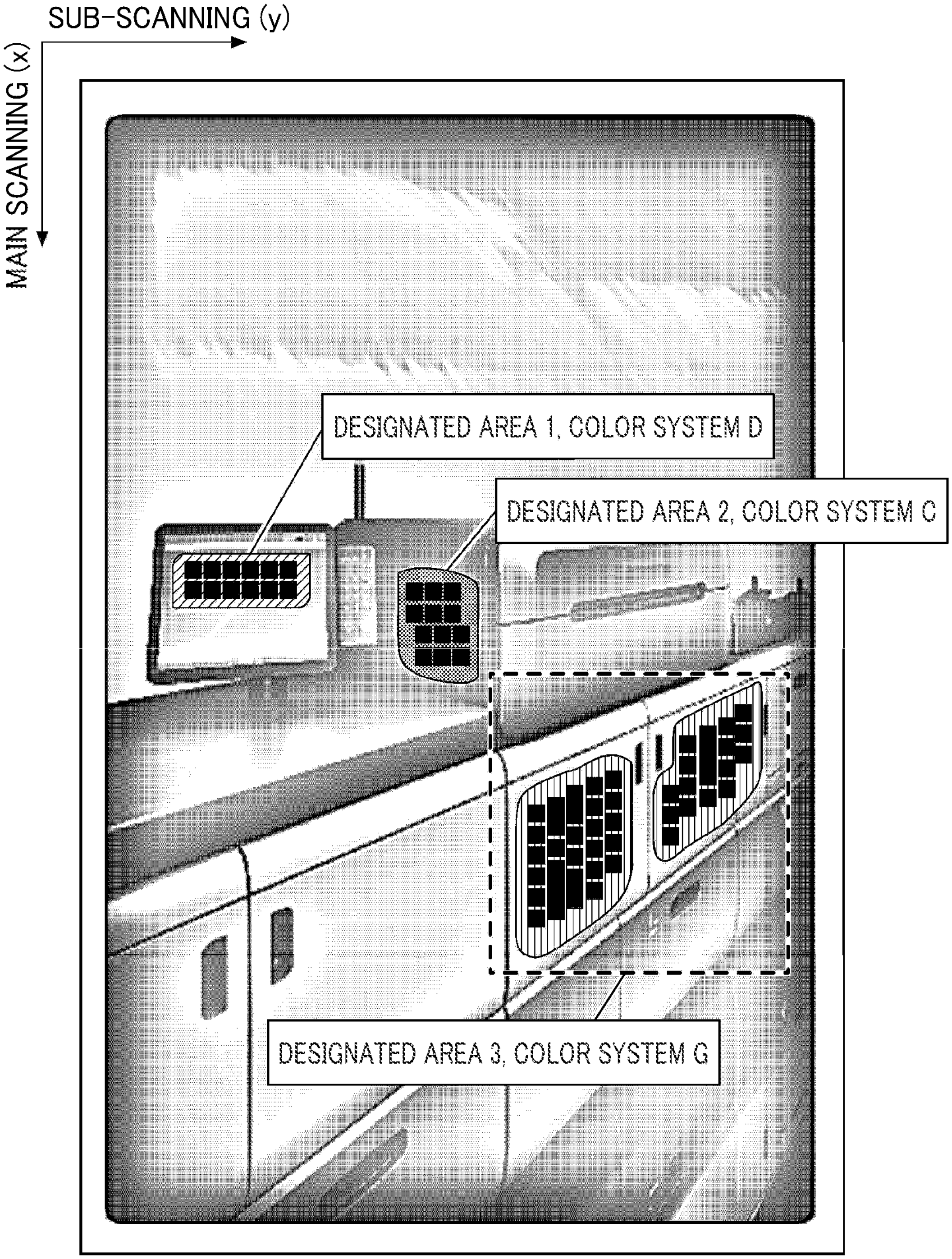
FIG. 11 is a diagram illustrating designation of a colorimetric area according to an embodiment of the present disclosure.

FIG. 11 is a diagram illustrating designation of a colorimetric area according to an embodiment. In FIG. 11, by way of example, a colorimetric area to be designated is designated from within the automatically extracted colorimetric area illustrated in FIG. 8. This configuration allows the user to designate and select, for example, an area for which the user desires to perform color management with special interest, and to perform color difference determination based on a colorimetric value in the selected area.

Figure 12:
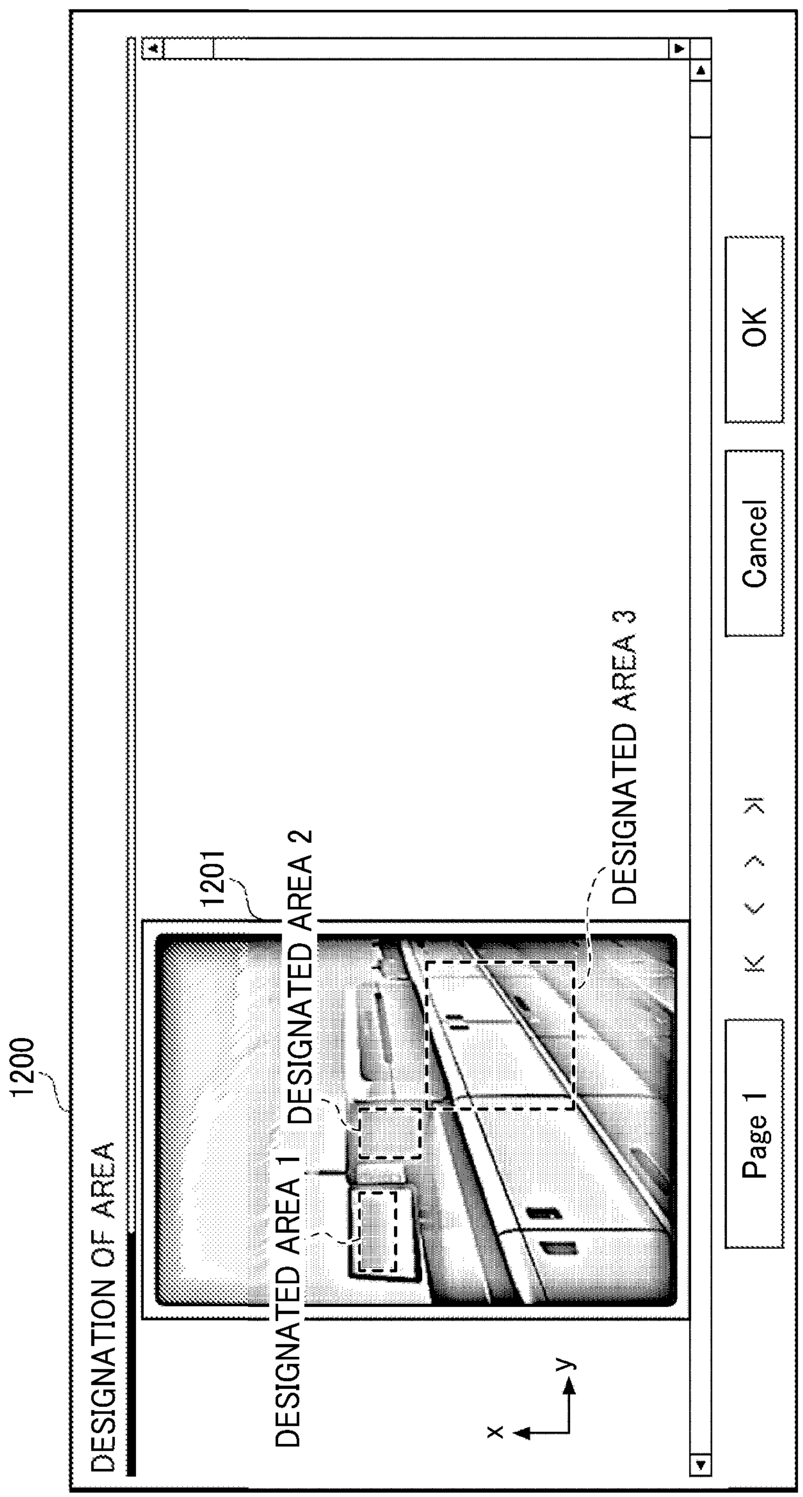
FIG. 12 is an illustration of an example of a colorimetric area designation screen according to an embodiment of the present disclosure.

In one example, as illustrated in FIG. 12, the display control unit 530 of the image forming apparatus 100 displays a colorimetric area designation screen 1200 that presents a job image 1201 to be printed. In one example, the user uses an input device such as a mouse or a touch panel to surround an area to be designated with a rectangular frame to designate the area.

In the example illustrated in FIG. 12, three designated areas, namely, designated area 1, designated area 2, and designated area 3 illustrated in FIG. 11, are designated. In one embodiment, the colorimetric area designation screen 1200 allows the user to designate one or more areas. In another embodiment, the colorimetric area designation screen 1200 allows the user to erase information on a designated area and designate another area. This addresses erroneous designation of an area by the user or a change of an incorrect area for which the user desires to perform color management.

Coordinate information of each of the designated colorimetric areas is transmitted to the colorimetric area extraction unit 606. The colorimetric area extraction unit 606 extracts a colorimetric area based on the transmitted coordinate information. The color difference determination unit 502 performs color difference determination based on a colorimetric value acquired in the extracted colorimetric area. This configuration allows the user to designate an area for which the user desires to perform color management with special interest, and to perform color difference determination based on a colorimetric value in the designated area.

In one example, the color difference determination unit 502 organizes the color differences ΔLab(nc)(p)(xi, yi) calculated for the respective colorimetric areas by classifying the color differences by designated areas and performs the determination based on a color difference calculated from the mean value of the colorimetric values $mesLab_{Dif(nc)(p)(xi, yi)}$ for the designated areas and the mean value of the reference values $mesLab_{Ref(p)(xi, yi)}$ for the designated areas.

In another example, the color difference determination unit 502 performs the classification by color systems and performs the determination based on a color difference calculated from the mean value of the colorimetric values $mesLab_{Dif(nc)(p)(xi, yi)}$, which are organized for each of the color systems, and the mean value of the reference values $mesLab_{Ref(p)(xi, yi)}$, which are organized for the corresponding one of the color systems. In another example, to perform the color difference determination for the same page, the color difference determination unit 502 organizes the colorimetric values $mesLab_{Dif(nc)(p)(xi, yi)}$ and the reference values $mesLab_{Ref(p)(xi, yi)}$ for each page unit and performs the determination based on a color difference calculated from the mean value of the organized colorimetric values $mesLab_{Dif(nc)(p)(xi, yi)}$ and the mean valued of the organized reference values $mesLab_{Ref(p)(xi, yi)}$.

In another example, the color difference determination unit 502 performs determination on colorimetric values organized for each of the color systems by receiving setting of multiple color-difference thresholds for the respective color systems. In another example, the image forming apparatus 100 receives setting of multiple color-difference thresholds for the respective areas or pages. In another example, the image forming apparatus 100 receives setting of a color-difference threshold common to the areas or pages.

In another example, the color difference determination unit 502 calculates the value of color difference ΔE from the color difference ΔLab(nc)(p)(xi, yi) in accordance with a calculation formula defined by the CIE and performs the determination based on the calculated color difference ΔE.

In another embodiment, the colorimetric area extraction unit 606 stores information on an area designated in a print job. When the same print job is to be executed again after a certain period of time, the colorimetric area extraction unit 606 calls the stored information on the designated area and reuses the called information on the designated area. This enables color difference evaluation for the same area in the same print job at the time of reprinting.

Color Difference Determination Process

Figure 13:
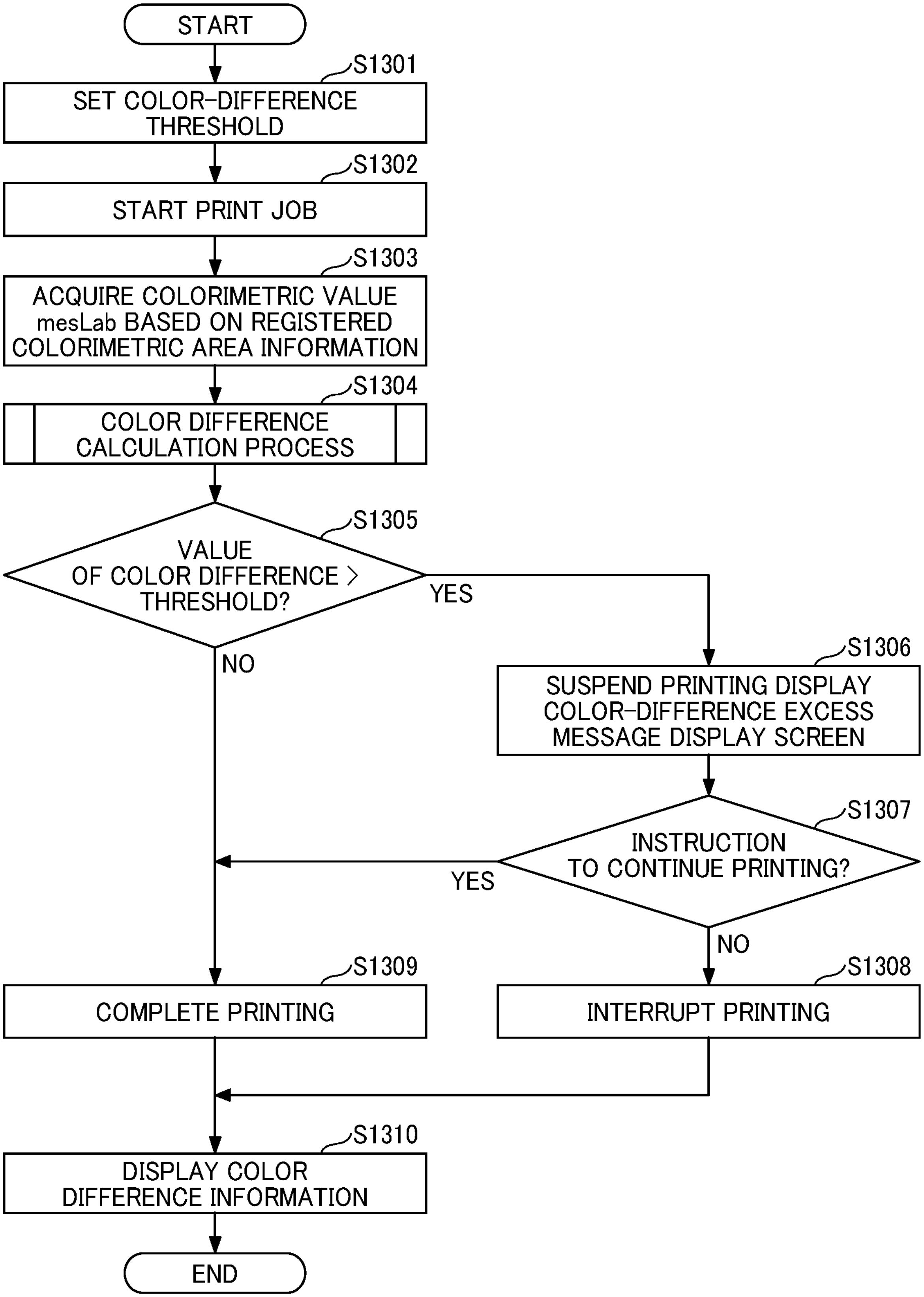
FIG. 13 is a flowchart illustrating an example of a color difference determination process according to an embodiment of the present disclosure.

FIG. 13 is a flowchart illustrating an example of a color difference determination process according to an embodiment. The illustrated process is an example of a color difference determination process executed by the image forming apparatus 100 to execute, for example, a print job set to include a plurality of copies after executing the reference value registration process illustrated in FIG. 7.

In step S1301, in response to receipt of an operation by the user, the image forming apparatus 100 receives setting of a color-difference threshold for performing color difference determination.

In step S1302, the image forming apparatus 100 starts a print job set to include a plurality of copies.

In step S1303, the color difference calculation unit 607 of the image forming apparatus 100 acquires a colorimetric value mesLab based on registered colorimetric area information. In step S1304, the color difference calculation unit 607 executes a color difference calculation process. The color difference calculation process is a process for printing an image on the sheet P and extracting, from the printed image, colorimetric values mesLab of a colorimetric area for respective pages, based on colorimetric area information registered in advance to calculate color differences between the colorimetric values mesLab and reference colorimetric values registered in advance for the first and subsequent copies. The details of the color difference calculation process will be described below.

In step S1305, the color difference determination unit 502 of the image forming apparatus 100 determines whether the value of the color difference calculated in the color difference calculation process exceeds the color-difference threshold set in step S1301. If the value of the calculated color difference exceeds the color-difference threshold, the color difference determination unit 502 causes the process to proceed to step S1306. On the other hand, if the value of the calculated color difference is less than or equal to the color-difference threshold, the color difference determination unit 502 causes the process to proceed to step S1309.

In step S1306, the image forming control unit 504 of the image forming apparatus 100 suspends the printing. The display control unit 530 displays, for example, a color-difference excess message display screen 1400 as illustrated in FIG. 14 on a display unit such as the operation panel 308.

Figure 14:
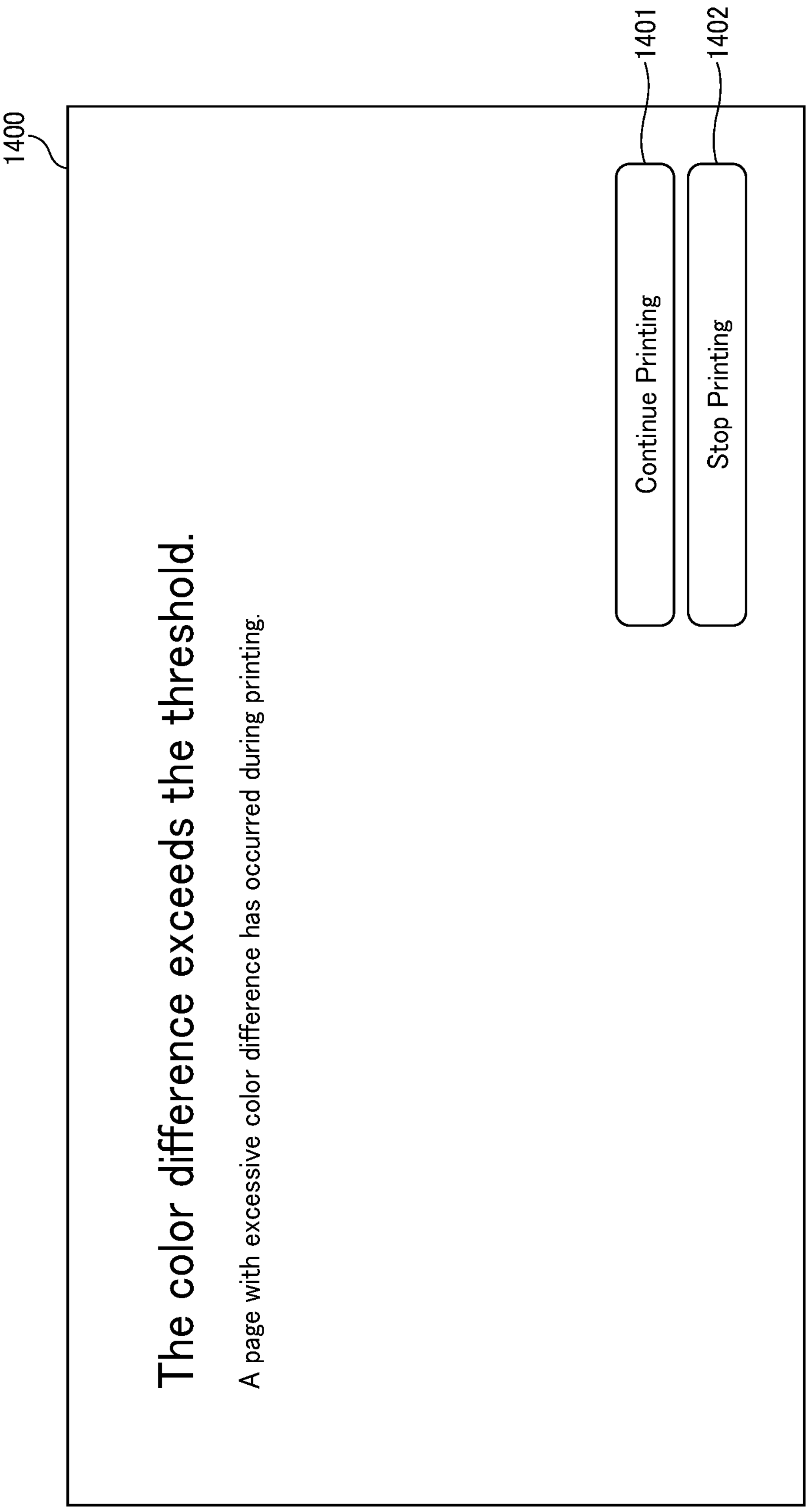
FIG. 14 is an illustration of an example of a color-difference excess message display screen according to an embodiment of the present disclosure.

FIG. 14 is an illustration of an example of a color-difference excess message display screen according to an embodiment. The color-difference excess message display screen 1400 includes, for example, a "Continue Printing" button 1401 and a "Stop Printing" button 1402.

In one example, in response to the user selecting the "Continue Printing" button 1401, the image forming control unit 504 instructs the image forming apparatus 100 to continue (resume) the suspended printing operation. In one example, in response to the user selecting the "Stop Printing" button 1402, the image forming control unit 504 instructs the image forming apparatus 100 to interrupt (stop) the suspended printing operation.

In step S1307, the display control unit 530 of the image forming apparatus 100 determines whether an instruction has been given on the color-difference excess message display screen 1400 to continue the printing. For example, if the user has selected the "Continue Printing" button 1401, the display control unit 530 determines that an instruction has been given to continue the printing. On the other hand, if the user has selected the "Stop Printing" button 1402, the display control unit 530 determines that no instruction has been given to continue the printing.

If an instruction has been given to continue the printing, the image forming control unit 504 causes the process to proceed to step S1309. On the other hand, if no instruction has been given to continue the printing, the display control unit 530 causes the process to proceed to step S1308.

In step S1308, the image forming control unit 504 interrupts (or stops) the printing, and then causes the process to proceed to step S1310.

In step S1309, the image forming control unit 504 continues (resumes) the printing to complete the print job, and then causes the process to proceed to step S1310.

In step S1310, the display control unit 530 of the image forming apparatus 100 displays a display screen indicating color difference information for each print job for which color difference determination has been performed. In one example, the display control unit 530 displays a color difference information display screen 1500 as illustrated in FIG. 15 on a display unit such as the operation panel 308.

Figure 15:
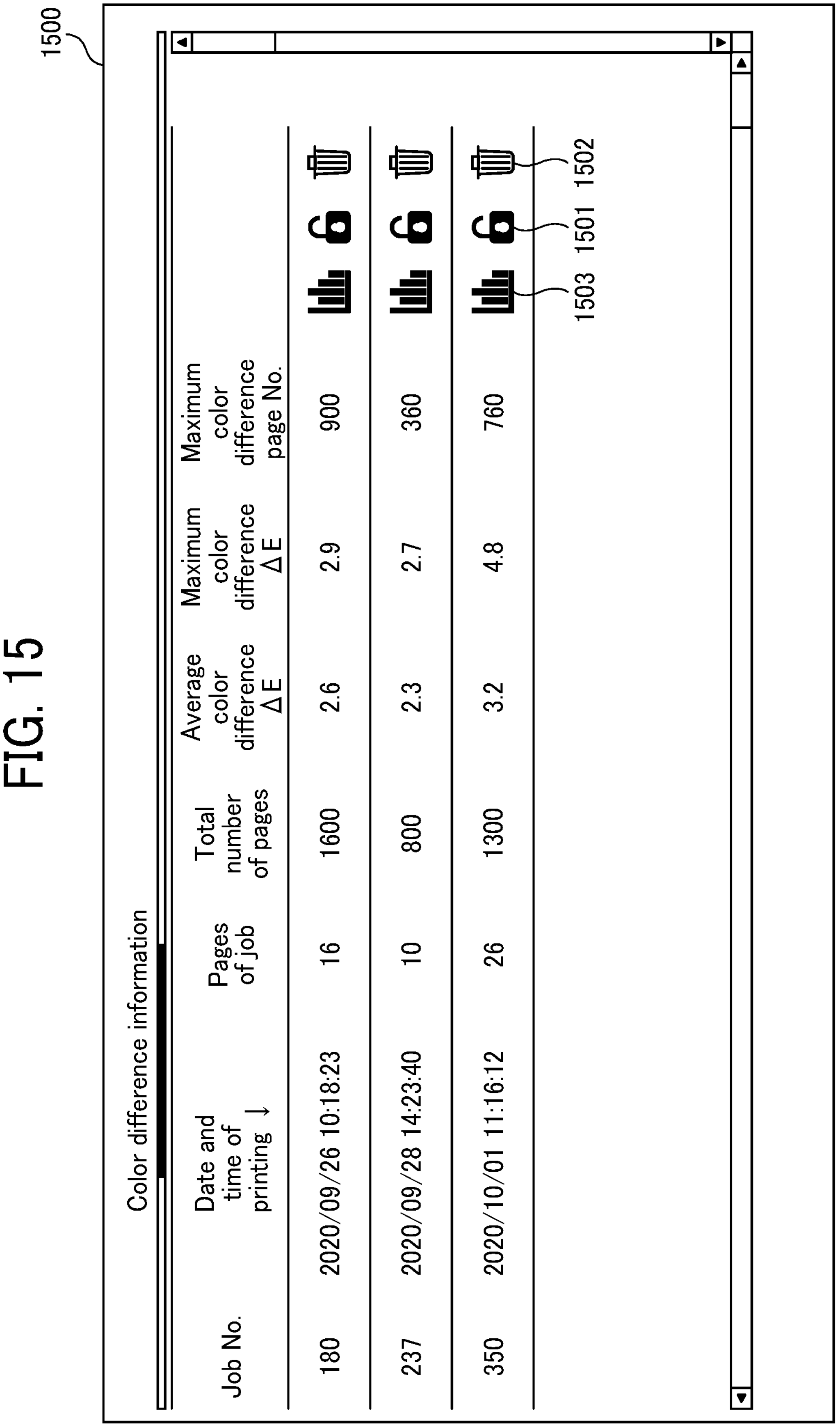
FIG. 15 is an illustration of an example of a color difference information display screen according to an embodiment of the present disclosure.

FIG. 15 is an illustration of an example of a color difference information display screen according to an embodiment. For example, the color difference information display screen 1500 displays, for each print job, a data protection button 1501, a data deletion button 1502, and a data check button 1503.

The data protection button 1501 is a graphical user interface (GUI) for displaying color difference information for each print job for which color difference determination has been performed and protecting the color difference information for a certain time period. In a time period during which the data protection button 1501 remains on (protection enabled), the color difference information of the associated print job remains undeleted and is protected.

The data deletion button 1502 is a GUI for deleting color difference information. In response to pressing of the data deletion button 1502, the image forming apparatus 100 deletes the color difference information of the associated print job.

The data check button 1503 is a GUI for checking details of color difference information. In response to pressing of the data check button 1503, the display control unit 530 of the image forming apparatus 100 displays detailed information of the color difference information of the associated print job. The detailed information includes, for example, a list of determination results for each color system and each copy, or a list of determination results for each area, each copy, or each page, with respect to the color difference determination results for each color system.

Color Difference Calculation Process

Figure 16:
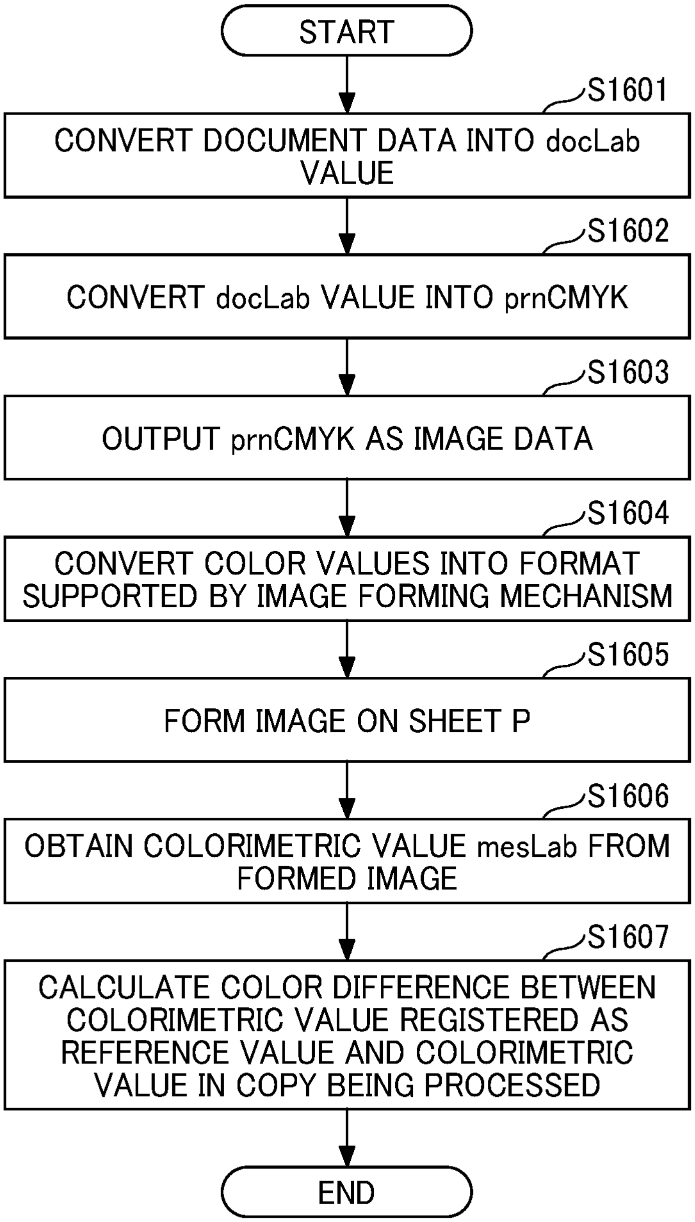
FIG. 16 is a flowchart illustrating an example of a color difference calculation process according to an embodiment of the present disclosure.

FIG. 16 is a flowchart illustrating an example of a color difference calculation process according to an embodiment. The illustrated process is an example of a color difference calculation process executed by the color difference calculation unit 607 in step S1304 illustrated in FIG. 13, for example. When the print job includes an instruction for printing a plurality of copies, the image forming apparatus 100 executes the processing of steps S1601 to S1607 described below for each of the plurality of copies.

In step S1601, the first conversion unit 601 of the image processing unit 510 converts the received document data Q into a device-independent color specification value docLab in Lab format. The document data Q is, for example, data indicating a color represented in RGB format or CMYK format.

In step S1602, the second conversion unit 602 converts the color specification value docLab into a gradation value prnCMYK, which is a set of 8-bit integer gradation values of colors of cyan C, magenta M, yellow Y, and black K, which are the basic colors of the image forming mechanism 4.

In step S1603, the gradation correction unit 603 outputs the gradation value prnCMYK as the image data R. In the initial state, the gradation correction unit 603 does not change the gradation value prnCMYK and outputs the gradation value prnCMYK as the image data R. In a case where gradation correction is to be performed as a result of the color stabilization process, the gradation correction unit 603 may perform gradation correction based on the result of the color stabilization process.

The processing of steps S1601 to S1603 is performed while, for example, vector data and fonts included in the document Q are expanded. The image data R obtained as a result of the processing is bitmap data of four colors of the basic colors C, M, Y, and K, which is obtained by quantizing the color information of the document data Q. The output image data R is stored in the image storage unit 604 of the image processing unit 510 for each document used for printing.

In step S1604, the gradation processing unit 501 converts, for each basic color, for example, the color values transmitted in 8-bit format into a format supported by the image forming mechanism 4. For example, the gradation processing unit 501 performs conversion by using an area coverage modulation method or an error diffusion method so as to match the number of gradations supported by the image forming mechanism 4.

In step S1605, the image forming control unit 504 forms an image on the sheet P, based on the output image data R. In one example, the image forming control unit 504 controls the image forming mechanism 4 to form a toner image, and the transfer unit 5 transfers the formed toner image onto the sheet P.

In step S1606, the image inspection unit 503 acquires a colorimetric value mesLab from the image formed on the sheet P. The toner image formed by the image forming control unit 504 is transferred onto the sheet P by the transfer unit 5 and then scanned using reflection characteristics of the toner image measured by the measurement sensor 45. The image inspection unit 503 measures a color of the scanned image and inputs a value obtained by measuring the color to the measurement value conversion unit 605 as a measurement value mesCol. The measurement value conversion unit 605 converts the input measurement value mesCol into a Lab value and outputs the colorimetric value mesLab in the form of a Lab value.

In step S1607, the color difference calculation unit 607 calculates a color difference between a reference colorimetric value registered in advance and the colorimetric value in the copy being processed.

Second Embodiment

Figure 17:
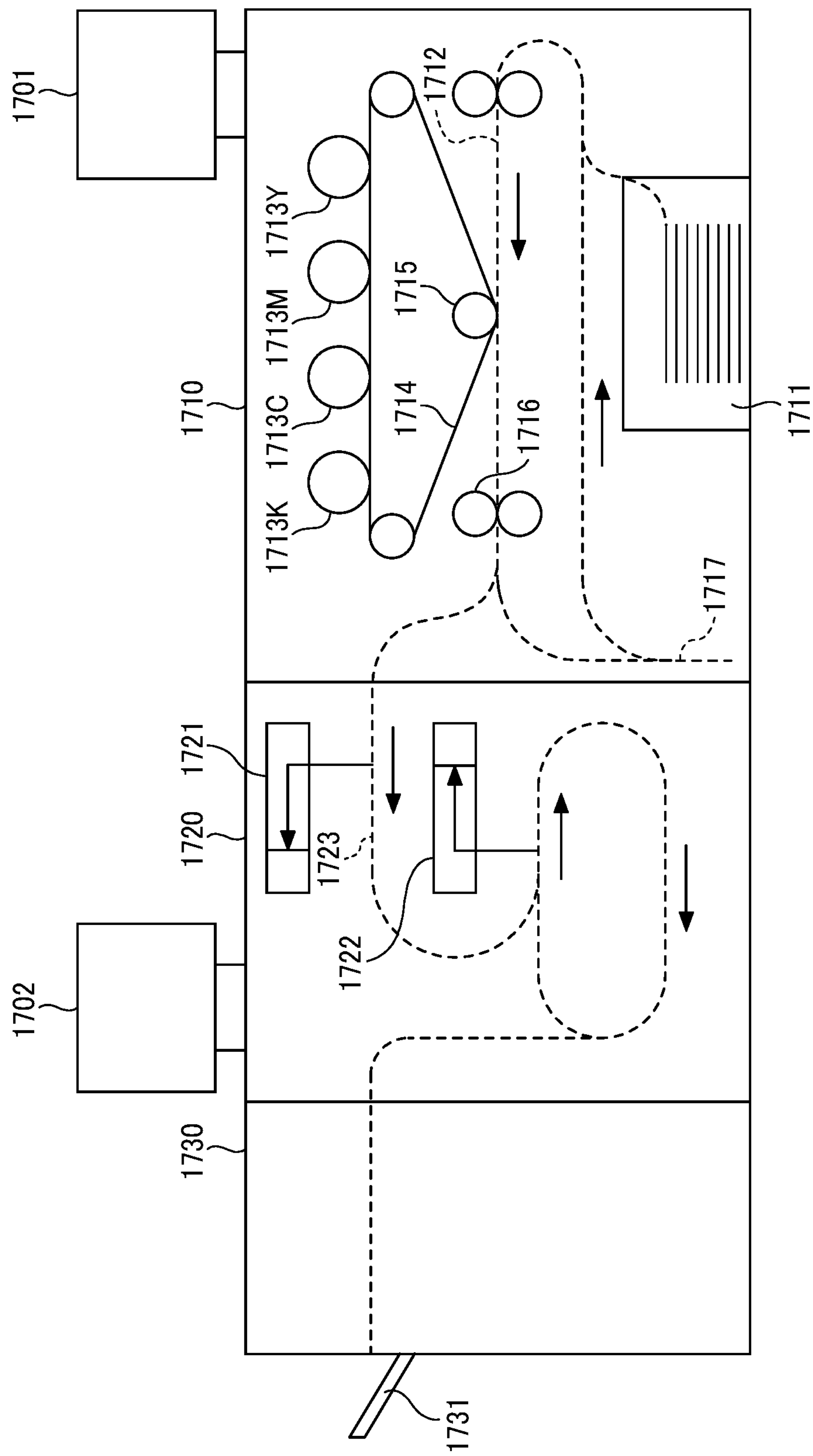
FIG. 17 is a diagram illustrating an example configuration of an image forming apparatus according to a second embodiment of the present disclosure.

The configuration of the image forming apparatus 100 illustrated in FIGS. 2 and 3 is an example. An image forming apparatus according to the present embodiment may be, for example, an image forming apparatus 1700, as illustrated in FIG. 17. The image forming apparatus 1700 includes a printing device 1710 and a print inspection device 1720. The printing device 1710 does not include the image inspection unit 503.

FIG. 17 is a diagram illustrating an example configuration of the image forming apparatus 1700 according to the second embodiment. In one example, as illustrated in FIG. 17, the image forming apparatus 1700 according to the second embodiment includes the printing device 1710, the print inspection device 1720, and a stacker 1730.

The printing device 1710 is a printer that performs printing on a sheet, which is a recording medium, based on print data and job information received from, for example, an external information processing apparatus. For example, the printing device 1710 acquires a sheet from a sheet feeder 1711 and conveys the acquired sheet along a conveyance path 1712. In the printing device 1710, photoconductor drums 1713K, 1713C, 1713M, and 1713Y of black (K), cyan (C), magenta (M), and yellow (Y), respectively, are arranged side by side along a conveyance belt 1714. The printing device 1710 superimposes toner images of the respective colors, which are formed on the photoconductor drums 1713K, 1713C, 1713M, and 1713Y, on the conveyance belt 1714, transfers the toner images onto a sheet being conveyed by a roller 1715, and fixes the toner images on the sheet by a roller 1716.

In the printing device 1710, the sheet is discharged directly to the print inspection device 1720 for simplex printing. For duplex printing, the sheet is reversed in a reverse path 1717, and the reversed sheet is conveyed again along the conveyance path 1712. As a result, the printing device 1710 transfers toner images onto the back side of the sheet and fixes the toner images in a manner similar to that for the front side of the sheet. After that, the printing device 1710 discharges the sheet to the print inspection device 1720.

The print inspection device 1720 is an inspection device for inspecting a printed material printed by the printing device 1710. For example, the print inspection device 1720 includes reading devices 1721 and 1722 to read both sides of a sheet in a conveyance path 1723 to generate a read image. The print inspection device 1720 discharges the read sheet to the stacker 1730.

Hardware Configuration

The printing device 1710 has a hardware configuration that is similar to the hardware configuration of the image forming apparatus 100 illustrated in FIG. 3 from which, for example, the scanner I/F 306, the scanner 307, and the measurement sensor 45 are removed. The print inspection device 1720 has a hardware configuration that is similar to the hardware configuration of the image forming apparatus 100 illustrated in FIG. 3 from which, for example, the printer engine I/F 305 and the image forming mechanism 4 are removed.

In the example illustrated in FIG. 17, in one example, but not limitation, the printing device 1710 includes an operation panel 1701, and the print inspection device 1720 includes an operation panel 1702, which is different from the operation panel 1701. In another example, the image forming apparatus 1700 includes either the operation panel 1701 or the operation panel 1702.

Functional Configuration

In one example, the printing device 1710 includes, for example, the image processing unit 510, the gradation processing unit 501, and the image forming control unit 504 illustrated in FIG. 6. In one example, the print inspection device 1720 includes, for example, the image inspection unit 503 and the color difference determination unit 502 illustrated in FIG. 6. In one example, the printing device 1710 includes the display control unit 530. In another example, the print inspection device 1720 includes the display control unit 530. In another example, both the printing device 1710 and the print inspection device 1720 include the display control unit 530.

The second embodiment makes it easy to additionally provide the existing printing device 1710 with the print inspection device 1720, which executes, for example, the reference value registration process illustrated in FIG. 7, the color difference determination process illustrated in FIG. 13, and the color difference calculation process illustrated in FIG. 16.

As described above, according to the present embodiment, it may be less likely that an image forming apparatus that prints a plurality of printed materials generates an unacceptable printed material with considerable color variation, which is caused by, for example, a change in the condition of the image forming apparatus and color variation during printing.

The image forming apparatus 100 according to the present embodiment extracts a colorimetric area in an image to be printed and determines color variation by using a color difference between copies of a print job, based on a colorimetric value obtained by performing colorimetry on an image printed on a sheet in the extracted colorimetric area. This configuration enhances the accuracy of color variation inspection for the image to be printed.

In one example, the colorimetric area extraction unit 606 extracts, as a colorimetric area, an area with a small change in gradation in the image to be printed. This configuration allows acquisition of an appropriate amount of color variation that is less affected by a change in color due to a difference in color gradation on an image.

In one example, in response to receipt of designation of an exclusion area to be excluded from an area for which colorimetry is to be performed in an area where an image is to be formed, the colorimetric area extraction unit 606 extracts, as a colorimetric area, an area other than the designated exclusion area. With this configuration, in a case where images are changed from one of continuously printed copies to another, colorimetry is implemented, excluding a colorimetric area included in an area in which images are changed.

In one example, in response to receipt of designation of an area for which colorimetry is to be performed in an area where an image is to be formed, the colorimetric area extraction unit 606 extracts the designated area as a colorimetric area. This configuration allows the user to designate an area for which the user desires to perform color management with interest, and to perform color difference determination based on a colorimetric value in the designated area.

In one example, the colorimetric area extraction unit 606 extracts a colorimetric area in units of areas having a pixel size specified in advance. With this configuration, at least one color of the area having the pixel size specified in advance in the colorimetric area is acquired to acquire a colorimetric value of the colorimetric area.

In one example, if it is determined that the area having the pixel size specified in advance is smaller than an area with a small change in gradation in an image to be printed, the colorimetric area extraction unit 606 extracts the colorimetric area in units of areas smaller than the pixel size. This configuration allows acquisition of an appropriate amount of color variation that is less affected by a change in color due to a difference in color gradation on an image.

In one example, if the color difference determination unit 502 determines that a color difference exceeds a set threshold, the image forming apparatus 100 suspends printing and displays a message indicating that the color difference exceeds the threshold. With this configuration, an operator or the like who performs a printing operation is notified of considerable color variation.

In one example, the image forming apparatus 100 displays information indicating the calculated color difference. This configuration allows the user to check the degree of color variation.

The functionality of the elements disclosed herein may be implemented using circuitry or processing circuitry which includes general purpose processors, special purpose processors, integrated circuits, ASICs ("Application Specific Integrated Circuits"), FPGAs ("Field-Programmable Gate Arrays"), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of a FPGA or ASIC.

The functional components of the image forming apparatus 100 may be integrated into one apparatus or divided into a plurality of apparatuses. At least some of the functional components of the image forming apparatus 100 may be included in the user terminal 101 or the server 102.

An image forming apparatus, an image forming system, an image forming method, and a program according to the following aspects are disclosed herein.

In a first aspect, an image forming apparatus includes a colorimetric area extraction unit and a color difference determination unit. The colorimetric area extraction unit extracts a colorimetric area from an area in which an image to be printed is to be formed. The color difference determination unit calculates a color difference between a first page and a second page and determines whether to continue printing, based on the calculated color difference. The first page is a page that is printed in advance with a print job for one copy and for which a colorimetric value in the colorimetric area is registered as a reference value. The second page is a page that is repeatedly printed with the print job for a plurality of copies.

According to a second aspect, the image forming apparatus of the first aspect further includes a reference value registration unit. The reference value registration unit registers, as the reference value, a colorimetric value in the colorimetric area extracted in response to the print job for which one copy is printed in advance.

According to a third aspect, in the image forming apparatus of the first aspect or the second aspect, the color difference determination unit calculates, as the color difference, a difference between a reference colorimetric value of the first page in the colorimetric area for the print job for which one copy is printed in advance and a colorimetric value of the second page of the print job for which a plurality of copies are repeatedly printed, the colorimetric value of the second page being a determination target.

According to a fourth aspect, in the image forming apparatus of the first aspect or the second aspect, the first page includes a page included in the print job for which one copy is printed in advance, the second page includes a page having a same page number as the first page and included in a first copy or a subsequent copy of the print job in a case where a plurality of copies of the print job are printed, and the color difference determination unit calculates a color difference between the page included in the print job for which one copy is printed in advance and a page having the same page number as the page and included in a plurality of copies of the print job, and determines whether to continue printing, based on the calculated color difference.

According to a fifth aspect, in the image forming apparatus of any one of the first to fourth aspects, the colorimetric area extraction unit receives, from a user, designation of at least one of an exclusion area and a colorimetric area to be added, based on an automatically extracted colorimetric area, the exclusion area being an area to be excluded from an area to be subjected to colorimetry in the area in which the image is to be formed, and sets, as the colorimetric area, an area changed in accordance with the received designation.

According to a sixth aspect, the image forming apparatus of any one of the first to fifth aspects further includes a display control unit. The color difference determination unit suspends printing in a case where the calculated color difference exceeds a set threshold. The display control unit displays a message indicating an excess of the color difference over the set threshold.

According to a seventh aspect, the image forming apparatus of any one of the first to sixth aspects further includes a display control unit. The display control unit displays information indicating the color difference calculated by the color difference determination unit.

In an eighth aspect, an image forming system includes an information processing apparatus and an image forming apparatus. The information processing apparatus transmits print job data including image data to the image forming apparatus. The image forming apparatus includes a colorimetric area extraction unit and a color difference determination unit. The colorimetric area extraction unit extracts a colorimetric area from an area in which an image to be printed is to be formed. The color difference determination unit calculates a color difference between a first page and a second page and determines whether to continue printing, based on the calculated color difference. The first page is a page that is printed in advance with a print job for one copy and for which a colorimetric value in the colorimetric area is registered as a reference value. The second page is a page that is repeatedly printed with the print job for a plurality of copies.

In a ninth aspect, an image forming method is executed by an image forming apparatus. The image forming method includes extracting a colorimetric area from an area in which an image to be printed is to be formed; and calculating a color difference between a first page and a second page and determining whether to continue printing, based on the calculated color difference, the first page being a page that is printed in advance with a print job for one copy and for which a colorimetric value in the colorimetric area is registered as a reference value, the second page being a page that is repeatedly printed with the print job for a plurality of copies.

In a tenth aspect, a program causes a computer to execute the image forming method of the ninth aspect.

According to an eleventh aspect, in the image forming apparatus of the first aspect, the colorimetric area extraction unit extracts, as the colorimetric area, an area with a small change in gradation in the image to be printed.

According to a twelfth aspect, in the image forming apparatus of the first aspect, in response to receipt of designation of an exclusion area to be excluded from an area for which colorimetry is to be performed in the area in which the image is to be formed, the colorimetric area extraction unit extracts, as the colorimetric area, an area other than the designated exclusion area.

According to a thirteenth aspect, in the image forming apparatus of the first aspect, in response to receipt, from a user, of designation of an area for which colorimetry is to be performed from within the colorimetric area extracted by the colorimetric area extraction unit in the area in which the image is to be formed, the colorimetric area extraction unit extracts the designated area as the colorimetric area.

According to a fourteenth aspect, in the image forming apparatus of any one of the eleventh to thirteenth aspects, the colorimetric area extraction unit cancels designation of an area by a user and receives designation of another area or a color.

According to a fifteenth aspect, in the image forming apparatus of the first aspect, the colorimetric area extraction unit stores information on an exclusion area designated in a print job, and in a case where the print job is to be executed again after a certain period of time, the colorimetric area extraction unit calls the stored information on the exclusion area and reuses the called information on the exclusion area.

According to a sixteenth aspect, in the image forming apparatus of the first aspect, the colorimetric area extraction unit extracts the colorimetric area in units of areas having a pixel size specified in advance.

According to a seventeenth aspect, in the image forming apparatus of the first aspect, in a case where it is determined that an area having a pixel size specified in advance is smaller than an area with a small change in gradation in the image to be printed, the colorimetric area extraction unit extracts the colorimetric area in units of areas smaller than the pixel size.

According to an eighteenth aspect, in the image forming apparatus of the first aspect, the color difference determination unit organizes color differences calculated for respective colorimetric areas by classifying the color differences by designated areas and performs a determination based on a color difference calculated from a mean value of colorimetric values for the designated areas and a mean value of reference values for the designated areas.

According to a nineteenth aspect, in the image forming apparatus of the eighteenth aspect, setting of a threshold for each of the designated areas is received, and the color difference determination unit compares the threshold with the color difference and performs the determination.

According to a twentieth aspect, in the image forming apparatus of the first aspect, the color difference determination unit organizes color differences calculated for respective colorimetric areas by classifying the color differences by color systems and performs a determination based on a color difference calculated from a mean value of colorimetric values for each of the color systems and a mean value of reference values for a corresponding one of the color systems.

According to a twenty first aspect, in the image forming apparatus of the twentieth aspect, setting of a threshold for each of the color systems is received, and the color difference determination unit compares the threshold with the color difference and performs the determination.

The invention claimed is:

1. An image forming apparatus comprising:
circuitry configured to
extract a colorimetric area from an area in which an image is to be formed, and
calculate a color difference between a first page and a second page, wherein
the first page includes a page included in a print job for which one copy is printed in advance and for which a colorimetric value in the colorimetric area is registered as a reference value,
the second page includes a page that is repeatedly printed with the print job for a plurality of copies, and having a same page number as the first page and included in a first copy or a subsequent copy of the print job in a case where the plurality of copies of the print job are printed, and
the circuitry is configured to calculate the color difference between the page included in the print job for which one copy is printed in advance and a page having the same page number as the page for which one copy is printed in advance and included in the plurality of copies of the print job, and to determine whether to continue printing based on the calculated color difference.

2. The image forming apparatus according to claim 1, wherein the circuitry is further configured to
register, as the reference value, a colorimetric value in the colorimetric area extracted in response to the print job for which one copy is printed in advance.

3. The image forming apparatus according to claim 1, wherein
the circuitry is configured to calculate, as the color difference, a difference between a reference colorimetric value of the first page in the colorimetric area for the print job for which one copy is printed in advance and a colorimetric value of the second page of the print job for which a plurality of copies are repeatedly printed, the colorimetric value of the second page being a determination target.

4. The image forming apparatus according to claim 1, wherein the circuitry is further configured to
suspend printing in a case where the calculated color difference exceeds a set threshold, and
display, on a display, a message indicating an excess of the color difference over the set threshold.

5. The image forming apparatus according to claim 1, wherein the circuitry is further configured to
display information indicating the color difference that is calculated.

6. An image forming apparatus comprising:
circuitry configured to
extract a colorimetric area from an area in which an image is to be formed, and
calculate a color difference between a first page and a second page, and determine whether to continue printing based on the calculated color difference,
the first page being a page that is printed in advance with a print job for one copy and for which a colorimetric value in the colorimetric area is registered as a reference value,
the second page being a page that is repeatedly printed with the print job for a plurality of copies, wherein
the circuitry is configured to:
receive, from a user, designation of at least one of an exclusion area and a colorimetric area to be added, based on a colorimetric area automatically extracted, the exclusion area being an area to be excluded from an area to be subjected to colorimetry in the area in which the image is to be formed; and
set, as the colorimetric area, an area changed in accordance with the received designation.

7. The image forming apparatus according to claim 6, wherein the circuitry is further configured to
register, as the reference value, a colorimetric value in the colorimetric area extracted in response to the print job for which one copy is printed in advance.

8. The image forming apparatus according to claim 6, wherein
the circuitry is configured to calculate, as the color difference, a difference between a reference colorimetric value of the first page in the colorimetric area for the print job for which one copy is printed in advance and a colorimetric value of the second page of the print job for which a plurality of copies are repeatedly printed, the colorimetric value of the second page being a determination target.

9. The image forming apparatus according to claim 6, wherein the circuitry is further configured to
suspend printing in a case where the calculated color difference exceeds a set threshold, and
display, on a display, a message indicating an excess of the color difference over the set threshold.

10. The image forming apparatus according to claim 6, wherein the circuitry is further configured to
display information indicating the color difference that is calculated.

11. An image forming system comprising:
an image forming apparatus including circuitry; and
an information processing apparatus to transmit print job data including image data to the image forming apparatus,
the circuitry being configured to
extract a colorimetric area from an area in which an image is to be formed based on the image data, and
calculate a color difference between a first page and a second page, wherein
the first page includes a page included in a print job for which one copy is printed in advance and for which a colorimetric value in the colorimetric area is registered as a reference value,
the second page includes a page that is repeatedly printed with the print job for a plurality of copies, and having a same page number as the first page and included in a first copy or a subsequent copy of the print job in a case where the plurality of copies of the print job are printed, and
the circuitry is configured to calculate the color difference between the page included in the print job for which one copy is printed in advance and a page having the same page number as the page for which one copy is printed in advance and included in the plurality of copies of the print job, and to determine whether to continue printing based on the calculated color difference.

12. The image forming system according to claim 11, wherein the circuitry is further configured to register, as the reference value, a colorimetric value in the colorimetric area extracted in response to the print job for which one copy is printed in advance.

13. The image forming system according to claim 11, wherein the circuitry is configured to calculate, as the color difference, a difference between a reference colorimetric value of the first page in the colorimetric area for the print job for which one copy is printed in advance and a colorimetric value of the second page of the print job for which a plurality of copies are repeatedly printed, the colorimetric value of the second page being a determination target.

14. The image forming system according to claim 11, wherein the circuitry is further configured to suspend printing in a case where the calculated color difference exceeds a set threshold, and display, on a display, a message indicating an excess of the color difference over the set threshold.

15. The image forming system according to claim 11, wherein the circuitry is further configured to display information indicating the color difference that is calculated.

16. An image forming method, comprising:

extracting a colorimetric area from an area in which an image is to be formed;

calculating a color difference between a first page and a second page, wherein the first page includes a page included in a print job for which one copy is printed in advance and for which a colorimetric value in the colorimetric area is registered as a reference value, the second page includes a page that is repeatedly printed with the print job for a plurality of copies, and having a same page number as the first page and included in a first copy or a subsequent copy of the print job in a case where the plurality of copies of the print job are printed, and the calculating comprises calculating the color difference between the page included in the print job for which one copy is printed in advance and a page having the same page number as the page for which one copy is printed in advance and included in the plurality of copies of the print job, and determining whether to continue printing based on the calculated color difference.

17. A non-transitory recording medium storing a plurality of instructions which, when executed by one or more processors, causes the processors to perform the image forming method of claim 16.

* * * * *